(12) United States Patent
Sakomizu

(10) Patent No.: US 10,171,805 B2
(45) Date of Patent: Jan. 1, 2019

(54) VIDEO ENCODING DEVICE AND PROGRAM, VIDEO DECODING DEVICE AND PROGRAM, AND VIDEO DISTRIBUTION SYSTEM

(71) Applicant: Oki Electric Industry Co., Ltd., Tokyo (JP)

(72) Inventor: Kazuhito Sakomizu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 445 days.

(21) Appl. No.: 13/778,754

(22) Filed: Feb. 27, 2013

(65) Prior Publication Data

US 2013/0230100 A1 Sep. 5, 2013

(30) Foreign Application Priority Data

Mar. 2, 2012 (JP) .................... 2012-047020

(51) Int. Cl.
*H04N 19/102* (2014.01)
*H04N 19/124* (2014.01)
(Continued)

(52) U.S. Cl.
CPC ..... *H04N 19/00569* (2013.01); *H04N 19/395* (2014.11)

(58) Field of Classification Search
CPC ... H04N 19/00569; H04N 19/395; H04N 7/26
(Continued)

(56) References Cited

U.S. PATENT DOCUMENTS 5,748,795 A * 5/1998 Ohnishi ................. G06T 9/007
375/240.2
6,256,343 B1 * 7/2001 Suzuki ................. H04N 19/105
348/411.1
(Continued)

FOREIGN PATENT DOCUMENTS

JP 2010-212863 A 9/2010

OTHER PUBLICATIONS

Japanese Office Action with translation dated Sep. 29, 2015.
(Continued)

*Primary Examiner* — Zaihan Jiang
(74) *Attorney, Agent, or Firm* — Rabin & Berdo, P.C.

(57) ABSTRACT

The present invention relates to a video distribution system including a video encoding device which generates video data encoded per a unit of frame and a video decoding device which decodes the video data supplied from the video encoding device. The video encoding device includes a predicted image generator which generates a predicted image of a non-key frame, by using a key frame, an updated original image generator which compares each parameter representing a predicted image of the non-key frame with respective parameter values for each parameter representing an original image of the non-key frame, and according to this comparison result, generates an updated original image by selecting parameter values of either the predicted image or the original image for each parameter, and an error correction code generator which generates an error correction code for correcting an error of the updated original image to the non-key frame.

19 Claims, 16 Drawing Sheets

(51) Int. Cl.
  *H04N 19/50* (2014.01)
  *H04N 19/30* (2014.01)
(58) Field of Classification Search
  USPC .................................................. 375/240.12
  See application file for complete search history.

(56) References Cited

U.S. PATENT DOCUMENTS

| | | | | |
|---|---|---|---|---|
| 6,628,839 | B1* | 9/2003 | Komiya | H04N 19/40 |
| | | | | 348/403.1 |
| 8,045,814 | B2* | 10/2011 | Odagiri | H04N 19/50 |
| | | | | 382/232 |
| 8,149,914 | B2* | 4/2012 | Shimauchi | H04N 19/29 |
| | | | | 375/240.16 |
| 9,036,712 | B1* | 5/2015 | Cote | H04N 19/139 |
| | | | | 375/240.24 |
| 2002/0136307 | A1* | 9/2002 | Imura | H04N 21/6375 |
| | | | | 375/240.24 |
| 2004/0247192 | A1* | 12/2004 | Kajiki | H04N 19/176 |
| | | | | 382/239 |
| 2005/0013496 | A1* | 1/2005 | Bruls et al. | 382/239 |
| 2010/0080288 | A1* | 4/2010 | Hamamoto | H04N 19/176 |
| | | | | 375/240.03 |
| 2010/0208801 | A1* | 8/2010 | Yamasaki | H04N 19/172 |
| | | | | 375/240.12 |
| 2010/0220787 | A1* | 9/2010 | Yamasaki | H04N 19/395 |
| | | | | 375/240.16 |
| 2010/0226431 | A1* | 9/2010 | Yamasaki | H04N 19/30 |
| | | | | 375/240.12 |
| 2011/0075726 | A1* | 3/2011 | Yamasaki | H04N 19/395 |
| | | | | 375/240.02 |
| 2011/0075733 | A1* | 3/2011 | Yamasaki | H04N 19/115 |
| | | | | 375/240.12 |

OTHER PUBLICATIONS

Bernd Girod et al., "Distributed Video Coding", Proc. IEEE, Special Issue on Advances in Video Coding and Delivery, Jan. 2005, vol. 93, No. 1, pp. 1-12.

Catarina Brites et al., "Encoder Rate Control for Transform Domain Wyner-Ziv Video Coding", IEEE International Conference on Image Processing 2007 (ICIP 2007), Sep. 16, 2007-Oct. 19, 2007, vol. 2, pp. II-5-II-8.

Marco Tagliasacchi et al., "A distributed-source-coding based robust spatio-temporal scalable video codec", Proc. Picture Coding Symposium, 2004.

João Ascenso et al., "Motion compensated refinement for low complexity pixel based distributed video coding", IEEE Conference on Advanced Video and Signal Based Surveillance 2005 (AVSS 2005), Sep. 15-16, 2005, pp. 593-598.

* cited by examiner

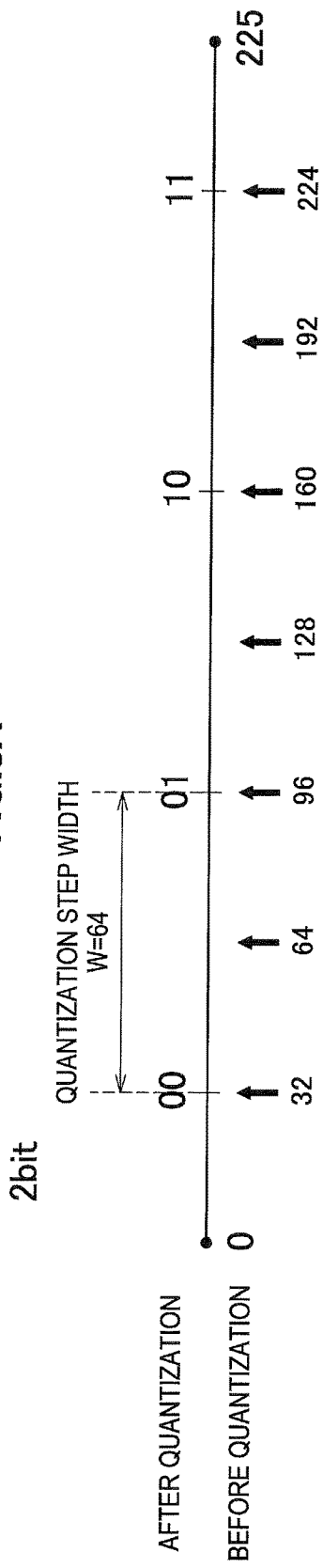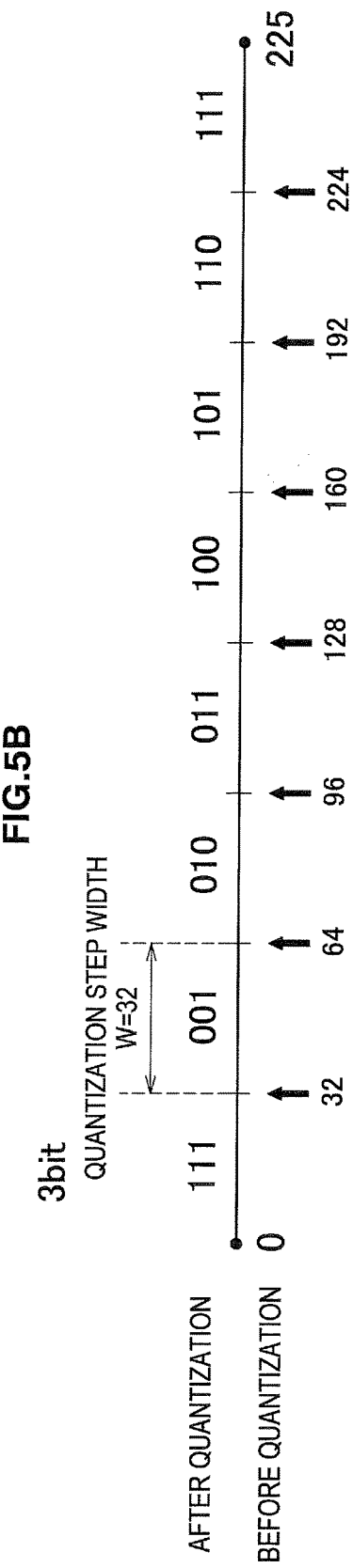

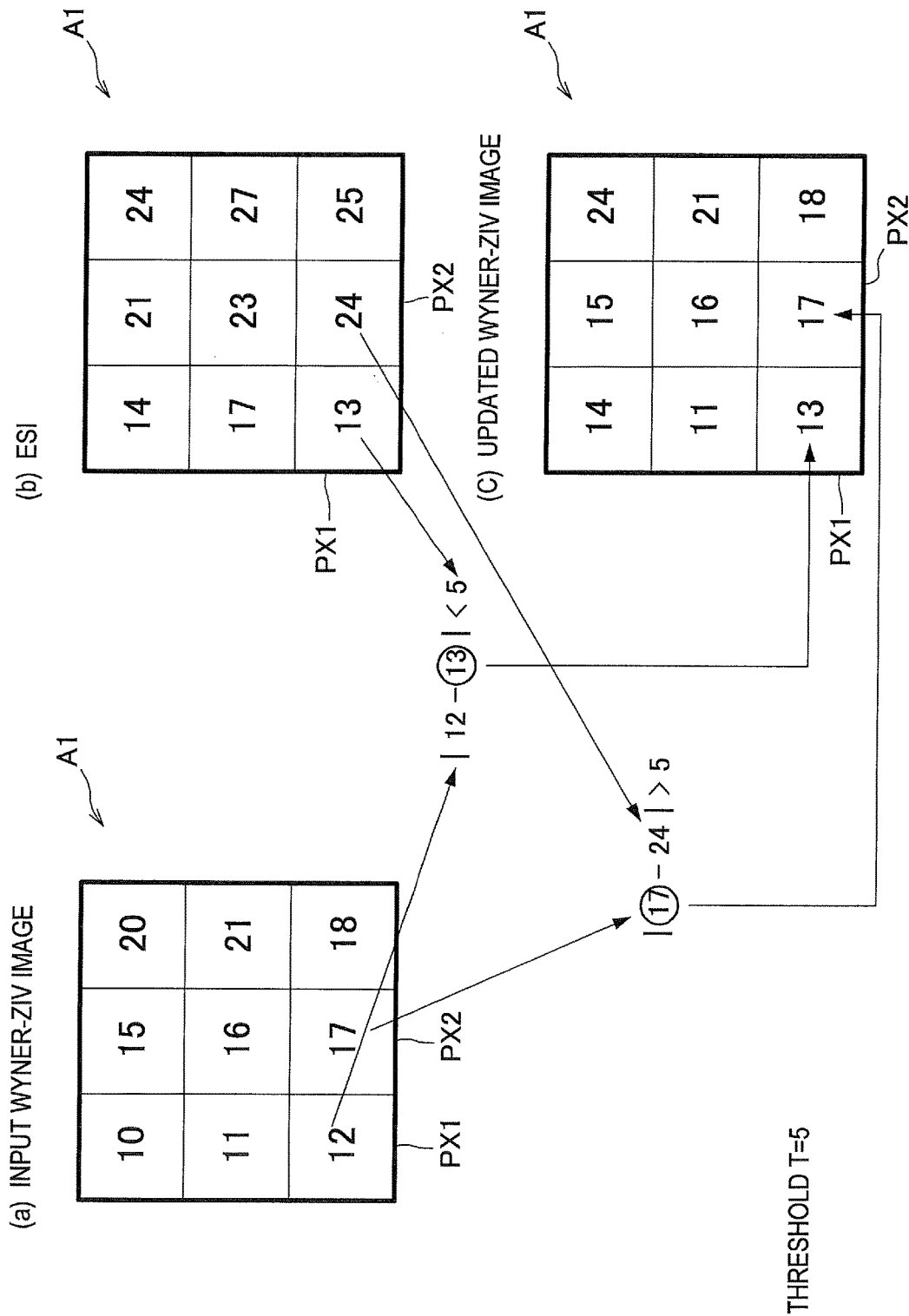

FIG.7

IN THE CASE WHERE PIXEL VALUES OF 8 BITS ARE QUANTIZED INTO 2 BITS (QUANTIZATION STEP WIDTH $W=2^{8-2}=64$)

| | Px1 | Px2 | Px3 | |
|---|---|---|---|---|
| PIXEL SEQUENCE OF INPUT WYNER-ZIV IMAGE α | 79 | 114 | 164 | |
| PIXEL SEQUENCE OF ESI β | 97 | 129 | 188 | |
| QUANTIZED VALUE SEQUENCE (BASE 2) OF βγ1 | 01 | 10 | 10 | |
| QUANTIZED VALUE SEQUENCE (BASE 2) OF αδ (GENERATE ERROR CORRECTION CODE FROM δ) | 01 | 01 | 10 | BIT NUMBER NECESSARY FOR ERROR CORRECTION → 5.5bit |
| DECODED PIXEL VALUE ε1 | 97 | 128 | 188 | |
| \|α-ε1\| | 18 | 14 | 24 | MEAN ERROR → 18.7 |

FIG.8

IN THE CASE WHERE PIXEL VALUES OF 8 BITS ARE QUANTIZED INTO 3 BITS (QUANTIZATION STEP WIDTH $W=2^{8-3}=32$)

| | Px1 | Px2 | Px3 | |
|---|---|---|---|---|
| PIXEL SEQUENCE OF INPUT WYNER-ZIV IMAGE α | 79 | 129 | 164 | |
| PIXEL SEQUENCE OF ESI β | 97 | 114 | 188 | |
| QUANTIZED VALUE SEQUENCE (BASE 2) OF βγ1 | 011 | 100 | 101 | |
| \|α−β\| | 19 | 15 | 41 | |
| PIXEL SEQUENCE OF UPDATED WYNER-ZIV IMAGE ζ | 79 | 129 | 164 | |
| QUANTIZED VALUE SEQUENCE (BASE 2) OF ζη (GENERATE ERROR CORRECTION CODE FROM ζ) | 010 | 100 | 101 | BIT NUMBER NECESSARY FOR ERROR CORRECTION → 4.5bit |
| DECODED PIXEL VALUE ε2 | 96 | 129 | 188 | |
| \|α−ε2\| | 17 | 15 | 24 | MEAN ERROR → 18.7 |

VIDEO ENCODING DEVICE AND PROGRAM, VIDEO DECODING DEVICE AND PROGRAM, AND VIDEO DISTRIBUTION SYSTEM

BACKGROUND

The present invention relates to a video encoding device and program, a video decoding device and program, and a video distribution system, and is applicable, for example, to a video distribution system which encodes and distributes video data by a DVC (Distributed Video Coding) method for a video.

This application is based upon and claims benefit of priority from Japanese Patent Application No. 2012-047020, filed on Mar. 2, 2012, the entire contents of which are incorporated herein by reference.

In recent years, attention has been drawn to encoding methods of DVC, such as that described in B. Girod, A M. Aaron, S. Rane, and D. Rebollo-Monedero, "Distributed Video Coding," Proceedings of the IEEE, vol. 93, Jan. 2005, pp. 71-83 (hereinafter, Non-Patent Literature 1), as video encoding methods for use in a video distribution system. These methods are encoding methods which perform a Slepian-Wolf encoding process for an original image to be encoded by an encoding section, and perform a decoding process of an image by performing Slepian-Wolf decoding for this encoded data along with a predicted image of the original image of the encoding section performed at the decoding side. Non-Patent Literature 1 discloses a video distribution system which includes a video encoding device and a video decoding device which perform encoding and decoding of a video based on Slepian-Wolf theory and Wyner-Ziv theory.

Next, an outline of a video distribution system which adopts the technology disclosed in Non-Patent Literature 1 will be described. In the video encoding device disclosed in Non-Patent Literature 1, an original image to be encoded (hereinafter, called a "Wyner-Ziv frame") is expressed by a quantized binary (bit), and is Slepian-Wolf encoded. Then, in the video encoding device, only parity bits from within this encoded result are stored.

On the other hand, the video decoding device disclosed in Non-Patent Literature 1 performs a transmission request for part of the parity bits stored in the video encoding device. Then, the video decoding device performs Slepian-Wolf decoding, from the received parity bits and Side Information (a predicted image, hereinafter called "SI"). In the case where sufficient decoding was not able to be performed, the video decoding device performs an additional transmission request of part of the parity bits again to the encoding section, and again performs Slepian-Wolf decoding from the additionally received parity bits and the above described SI. Then, the video decoding device repeats the above described process until sufficient decoding can be performed.

However, in the system of the DVC method disclosed in Non-Patent Literature 1 (a system which performs encoding and decoding of a video based on Slepian-Wolf theory and Wyner-Ziv theory), the generation of SI in principle is not performed at the video encoding device side. However, it is difficult in the system of a DVC method to achieve a higher encoding efficiency under a restriction of not generating SI at the video encoding device side. Accordingly, studies have been conducted which are used in an encoding process by generating SI at the video encoding device side as well. The technology described in C. Brites and F. Pereira, "Encoder rate control for transform domain Wyner-Ziv video coding," Image Processing, 2007. ICIP 2007. IEEE International Conference on, IEEE, 2007. pp. 4-7 (hereinafter, Non-Patent Literature 2), and M. Tagliasacchi, A. Majumdar, and K. Ramchandran, "A distributed-source-coding based robust spatio-temporal scalable video codec," Proc. Picture Coding Symposium, Citeseer, 2004 (hereinafter, Non-Patent Literature 3), are technologies in related art which are used in an encoding process by generating SI at the video encoding device side.

In Non-Patent Literature 2, the amount of parity bits necessary for error correction (hereinafter, called the "amount of codes") is calculated so as to eliminate the need for a re-transmission request of the parity bits from the video decoding device to the video encoding device. Specifically, Non-Patent Literature 2 achieves a technique which may not require feedback in a video encoding device, by generating SI capable of generation by a computation amount lower than the SI generated at the image decoding device side, and calculating an amount of codes necessary for estimating and correcting an error of the SI based on the same. In the case where there is a scalable structure, such as in the technology disclosed in Non-Patent Literature 3, information of a base layer may be used when generating SI at the video encoding device side.

While it may be necessary to generate SI with a prediction accuracy higher than, or at least equal to, SI generated by the video encoding device so as to improve the quality of a decoded image in the video decoding device, a greater computation amount may be necessary to generate SI with a high prediction accuracy. A method, which obtains SI with a prediction accuracy of a fixed value or more in the video encoding device by additionally performing a process which re-generates high-quality SI, in cases such as where SI once generated does not satisfy a prescribed quality, is presented in J. Ascenso, C. Brites, and F. Pereira, "Motion compensated refinement for low complexity pixel based distributed video coding," Proceedings IEEE Conference on Advanced Video and Signal Based Surveillance, 2005, pp. 593-598 (hereinafter, Non-Patent Literature 4), as a method which generates SI with a high prediction accuracy.

SUMMARY

In the case where SI is generated by the video encoding device of the existing method, the amount of codes which are supplied to the video decoding device side increases and decreases in proportion to an error amount between quantized values of the generated SI and quantized values of a Wyner-Ziv image. That is, in the video encoding device of the existing method, more parity bits of the amount of codes will be supplied to the video decoding device side as the error amount of the above described quantized values increases.

On the other hand, while the above described amount of codes is less in the video encoding device, and is preferable from the viewpoint of the transmitting efficiency or the like, the quality of the decoded image generated at the video decoding device side declines when the amount of codes decreases.

Accordingly, a video encoding device and program, a video decoding device and program, and a video distribution system are desired, which can decrease the amount of codes without a decline in the quality of a decoded image.

According to a first embodiment of the present invention, a video encoding device which encodes a video signal having a frame sequence includes: (1) a predicted image generator which generates a predicted image of a non-key frame, by using a key frame in the frame sequence, (2) an updated original image generator which compares respective parameter values between each parameter representing a predicted image of the non-key frame and each parameter representing an original image of the non-key frame, and according to this comparison result, generates an updated original image by selecting parameter values of either the predicted image or the original image for each parameter, and (3) an error correction code generator which generates an error correction code for correcting an error of the updated original image to the non-key frame.

According to a second embodiment of the present invention, a video decoding device which decodes video data obtained by encoding a video signal having a frame sequence per a unit of frame includes: (1) a key frame decoder which obtains a key frame by decoding encoded data of a key frame included in the video data, (2) a first predicted image generator which generates a first predicted image of a non-key frame in the frame sequence, by using the decoded key frame, (3) a second predicted image generator which generates a second predicted image, which is similar to an image used when generating encoded data of a non-key frame constituting the video data, by using the decoded key frame, (4) an updated predicted image generator which generates an updated predicted image, by selecting parameter values of either the first predicted image or the second predicted image for each parameter representing the non-key frame, and (5) an error corrector which generates, in the case where the encoded data of the non-key frame of the video data is an error correction code which corrects an error of the predicted image with respect to an original image of the non-key frame, a corrected image which is corrected by using the error correction code for the updated predicted image of the non-key frame.

According to a third embodiment of the present invention, a video encoding program causes a computer, mounted on a video encoding device which encodes a video signal having a frame sequence, to function as: (1) a predicted image generator which generates a predicted image of a non-key frame, by using a key frame in the frame sequence, (2) an updated original image generator which compares respective parameter values between each parameter representing a predicted image of the non-key frame and each parameter representing an original image of the non-key frame, and according to this comparison result, generates an updated original image by selecting parameter values of either the predicted image or the original image for each parameter, and (3) an error correction code generator which generates an error correction code for correcting an error of the updated original image to the non-key frame.

According to a fourth embodiment of the present invention, a video decoding program causes a computer, mounted on a video decoding device which decodes video data obtained by encoding a video signal having a frame sequence per a unit of frame, to function as: (1) a key frame decoder which obtains a key frame by decoding encoded data of a key frame included in the video data, (2) a first predicted image generator which generates a first predicted image of a non-key frame in the frame sequence, by using the decoded key frame, (3) a second predicted image generator which generates a second predicted image, which is similar to an image used when generating encoded data of a non-key frame constituting the video data, by using the decoded key frame, (4) an updated predicted image generator which generates an updated predicted image, by selecting parameter values of either the first predicted image or the second predicted image for each parameter representing the non-key frame, and (5) an error corrector which generates, in the case where the encoded data of the non-key frame of the video data is an error correction code which corrects an error of the predicted image with respect to an original image of the non-key frame, a corrected image which is corrected by using the error correction code for the updated predicted image of the non-key frame.

According to a fifth embodiment of the present invention, a video distribution system includes a video encoding device which generates video data by encoding a video signal having a frame sequence per a unit of frame, and a video decoding device which decodes the video data supplied from the video encoding device, and the video encoding device of the first embodiment of the present invention is applied as the video encoding device.

According to the embodiments of the present invention, a video distribution system can be provided which can decrease the amount of codes without a decline in the quality of a decoded image.

BRIEF DESCRIPTION OF THE DRAWINGS

FIG. 5A and FIG. 5B are explanatory diagrams which show quantization of an image in the video encoding device according to the first embodiment of the present invention;

FIG. 6 is an explanatory diagram which shows a generation process of an updated Wyner-Ziv image performed by the video encoding device according to the first embodiment of the present invention;

FIG. 7 is an explanatory diagram (1) which shows a verification result related to the effect of the first embodiment of the present invention;

FIG. 8 is an explanatory diagram (2) which shows a verification result related to the effect of the first embodiment of the present invention;

DETAILED DESCRIPTION OF THE EMBODIMENT(S)

(A) The First Embodiment

Hereinafter, a video encoding device and program, a video decoding device and program, and a video distribution system according to the present invention will be described in detail while referring to the figures.

(A-1) Configuration of the First Embodiment

Figure 2:
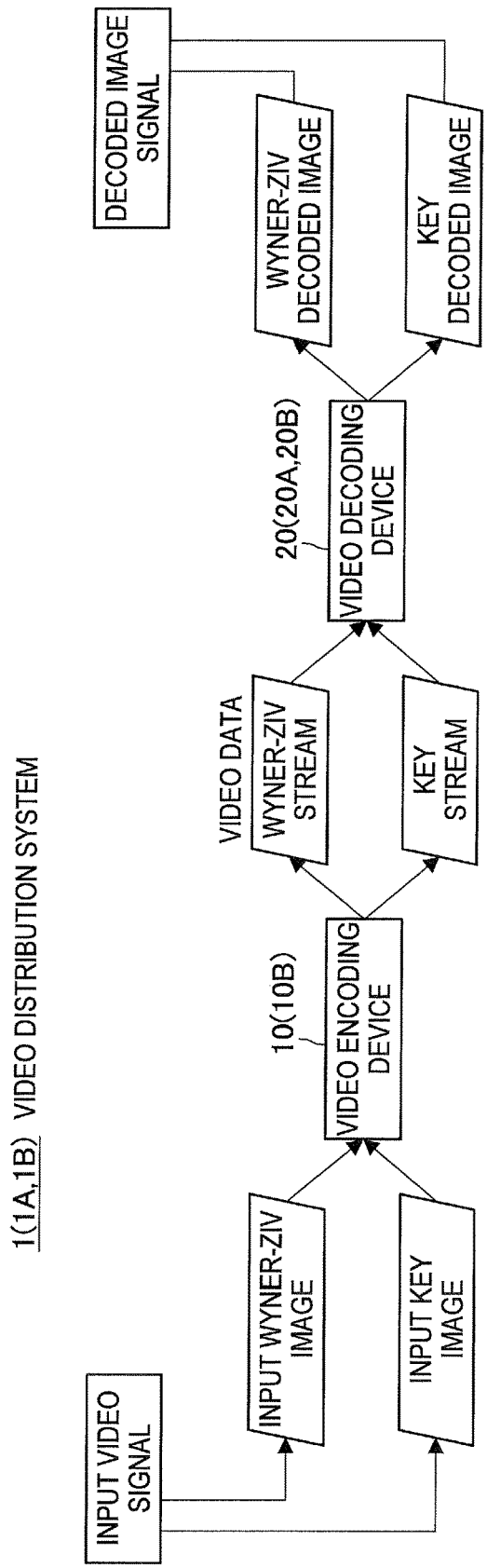
FIG. 2 is a block diagram which shows the overall configuration of a video distribution system according to the first embodiment of the present invention.

FIG. 2 is a block diagram which shows the overall configuration of a video distribution system 1 of the first embodiment.

The video distribution system 1 has a video encoding device 10 and a video decoding device 20.

Figure 1:
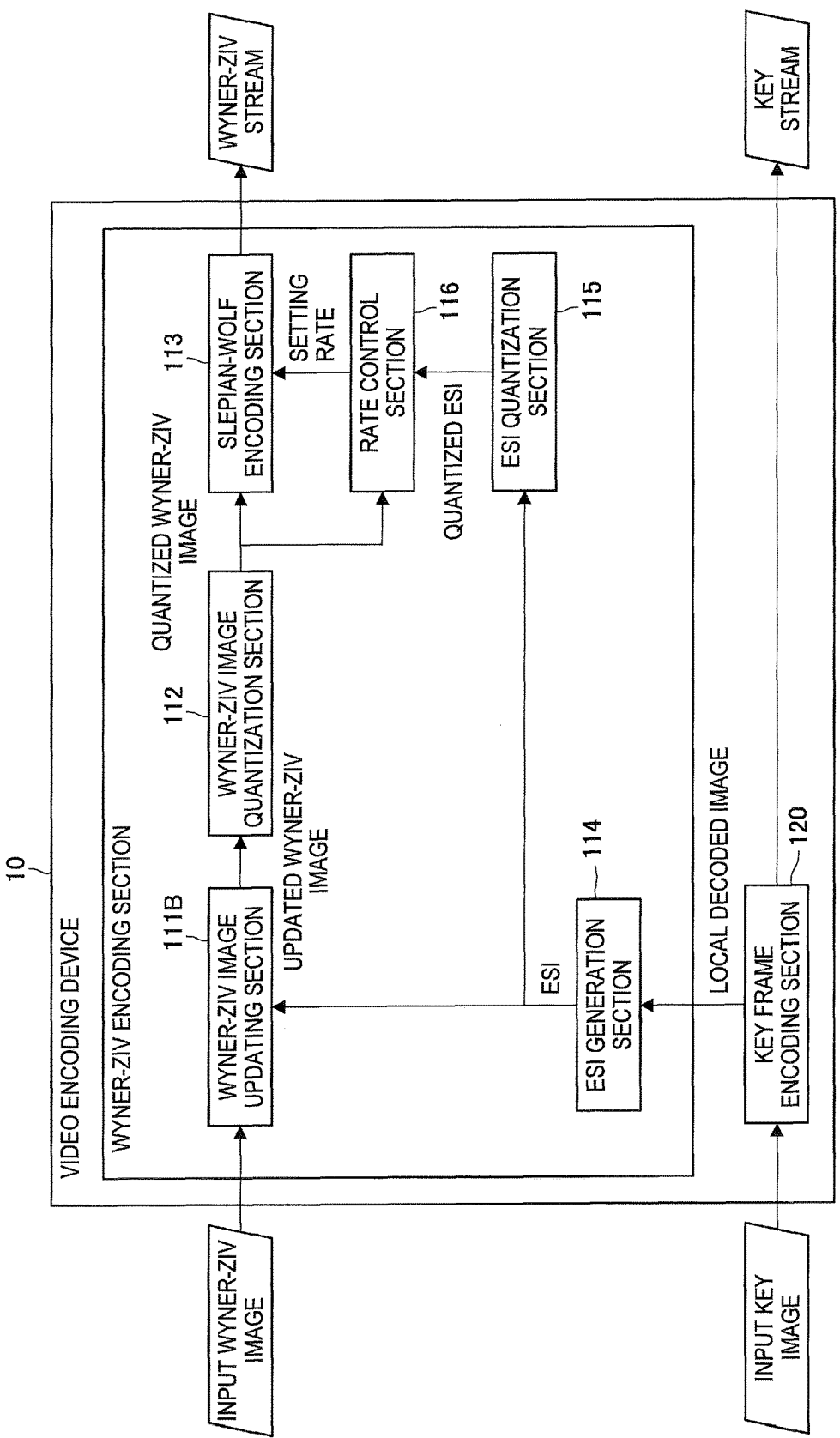
FIG. 1 is a block diagram which shows a functional configuration of a video encoding device according to the first embodiment of the present invention.

The video encoding device 10 encodes a video input signal (input video signal) which is input per a unit of frame (image unit), and outputs the encoded data formed into a stream. In the video encoding device, as shown in FIG. 1, each image constituting the input video signal is encoded by dividing into an input Wyner-Ziv image and an input key image. Then, the video encoding device 10 outputs a stream of encoded data obtained by encoding the input Wyner-Ziv image (hereinafter, called a "Wyner-Ziv stream"), and a stream of data obtained by encoding the input key image (hereinafter, called a "key stream").

The video decoding device 20 decodes the encoded data (the Wyner-Ziv stream and the key stream) which is output from the video encoding device 10, generates a decoded image (decoded frame), and outputs a decoded video signal (decoded image signal) per a unit of frame (image unit). The video decoding device 20 outputs a decoded video signal, which matches the Wyner-Ziv decoded image obtained by decoding the Wyner-Ziv stream with the key decoded image obtained by decoding the key stream.

Next, a functional configuration of the video encoding device 10 will be described by using FIG. 1.

The video encoding device 10 has a Wyner-Ziv encoding section 110 which outputs a Wyner-Ziv stream by encoding an input Wyner-Ziv image, and a key frame encoding section 120 which outputs a key stream by encoding an input key image.

While the video encoding device 10 may be constructed, for example, in a configuration executing a program, such as a CPU, a ROM, a RAM, an EEPROM and a hard disk, by installing a video encoding program of the present embodiments, even in that case, it can be functionally represented such as by that of FIG. 1.

The key frame encoding section 120 encodes the input key image by a known encoding technology (an encoding process within a screen) which includes H.264/AVC. Further, the key frame encoding section 120 generates a local decoded image based on the input key image, and supplies the local decoded image to an ESI generation section 114. Note that while the ESI generation section 114 generates ESI from the local decoded image, the effect of the present invention is not limited to the case where ESI is generated from the local decoded image.

The Wyner-Ziv encoding section 110 performs encoding of the input Wyner-Ziv image based on Slepian-Wolf theory and Wyner-Ziv theory. Note that in the present invention, SI generated at the video encoding device 10 side is expressed as ESI (Encoder Side Information).

The Wyner-Ziv encoding section 110 has a Wyner-Ziv image updating section 111, a Wyner-Ziv image quantization section 112, a Slepian-Wolf encoding section 113, an ESI generation section 114, an ESI quantization section 115, and a rate control section 116.

The ESI generation section 114 generates ESI from the local decoded image.

The ESI quantization section 115 generates quantized (binarized) ESI, which the ESI generation section 114 has generated (hereinafter, called "quantized ESI").

The Wyner-Ziv image update section 111 generates an image which has updated the input Wyner-Ziv image using ESI (hereinafter, called an "updated Wyner-Ziv image"). The details of the correction process, which the Wyner-Ziv image update section 111 performs, will be described later.

The Wyner-Ziv image quantization section 112 generates a quantized (binarized) updated Wyner-Ziv image (hereinafter, called a "quantized Wyner-Ziv image").

The rate control section 116 determines an amount of codes (rate) per one image (frame), which is set by a Slepian-Wolf encoding process of the Wyner-Ziv encoding section 110, from the quantized ESI and the quantized Wyner-Ziv image, and outputs this determined value (hereinafter, called a "setting rate"). The setting rate becomes an amount of codes of one frame part constituting the Wyner-Ziv stream. The rate control section 116 compares, for example, the updated Wyner-Ziv image with the ESI, and calculates the amount of codes necessary for estimating and correcting an error of the ESI as the setting rate. For example, the technology disclosed in Non-Patent Literature 2 may be used as a method which determines the setting rate in the rate controlling section 116.

The Slepian-Wolf encoding section 113 Slepian-Wolf encodes the quantized Wyner-Ziv image, and generates a Wyner-Ziv stream by an amount of codes based on the setting rate.

Next, a functional configuration of the video decoding device 20 will be described by using FIG. 3.

The video decoding device 20 has a Wyner-Ziv decoding section 210 which decodes the Wyner-Ziv stream and obtains a Wyner-Ziv decoded image, and a key frame decoding section 230 which decodes the key stream and obtains a key decoded image.

Figure 3:
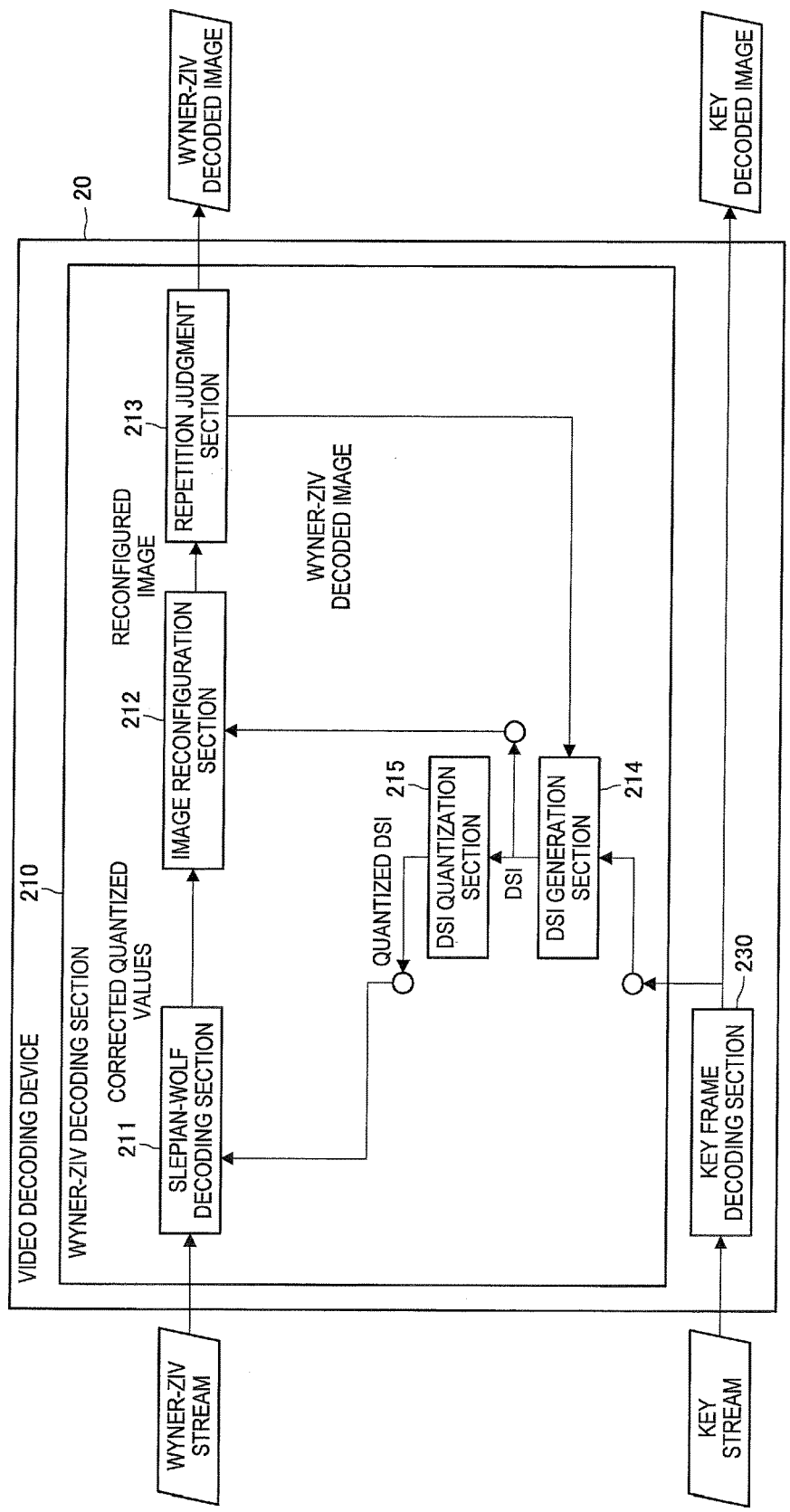
FIG. 3 is a block diagram which shows a functional configuration of a video decoding device according to the first embodiment of the present invention.

While the video decoding device 20 may be constructed, for example, in a configuration executing a program, such as a CPU, a ROM, a RAM, an EEPROM and a hard disk, by installing a video decoding program of the present embodiments, even in that case, it can be functionally represented such as by that of FIG. 3.

The key frame decoding section 230 obtains a key decoded image from the key stream, by a decoding process (a decoding process within a screen) corresponding to the encoding process of the key frame encoding section 120.

The Wyner-Ziv decoding section 210 decodes the Wyner-Ziv stream based on Slepian-Wolf theory and Wyner-Ziv theory, and obtains a Wyner-Ziv decoded image. Note that in the present invention, SI generated at the video decoding device 20 side is expressed as DSI (Decoder Side Information).

The Wyner-Ziv decoding section 210 has a Slepian-Wolf decoding section 211, an image reconfiguration section 212, a repetition judgment section 213, a DSI generation section 214, and a DSI quantization section 215.

The DSI generation section 214 generates DSI by using the key decoded image.

The DSI quantization section 215 generates quantized (binarized) DSI in a pixel unit (hereinafter, called "quantized DSI").

The Slepian-Wolf decoding section 211 generates a corrected prediction error included in the quantized DSI, by using the Wyner-Ziv stream (hereinafter, called a "corrected quantized value").

The image reconfiguration section 212 generates an image (reconfigured image) which has been reconfigured (a type of inverse quantization) by using the corrected quantized value and the DSI.

The repetition judgment section 213 judges whether or not DSI is to be re-generated by using the reconfigured image, and in the case where it is to be re-generated, the reconfigured image is output to the DSI generation section 214 as a Wyner-Ziv decoded image, and in the case where it is not to be re-generated, the reconfigured image is output as a Wyner-Ziv decoded image.

The repetition judgment section 213 can apply methods, such as those which use a generation frequency of DSI, or those which evaluate the quality of the reconfigured image by an objective evaluation method, as a standard which judges whether or not re-generation of DSI is implemented. In the case where the repetition judgment section 213 uses the generation frequency of DSI as a standard, when judging the necessity of DSI regeneration, the repetition judgment section 213 outputs a Wyner-Ziv decoded image until the generation frequency of DSI reaches a predetermined generation frequency.

Then, when the Wyner-Ziv decoded image is given, the DSI generation section 214 generates a higher quality predicted image, by using information of the Wyner-Ziv decoded image.

(A-2) Operations of the First Embodiment

Next, the operations of the video distribution system 1 of the first embodiment, which has a configuration such as that described above, will be described.

Figure 4:
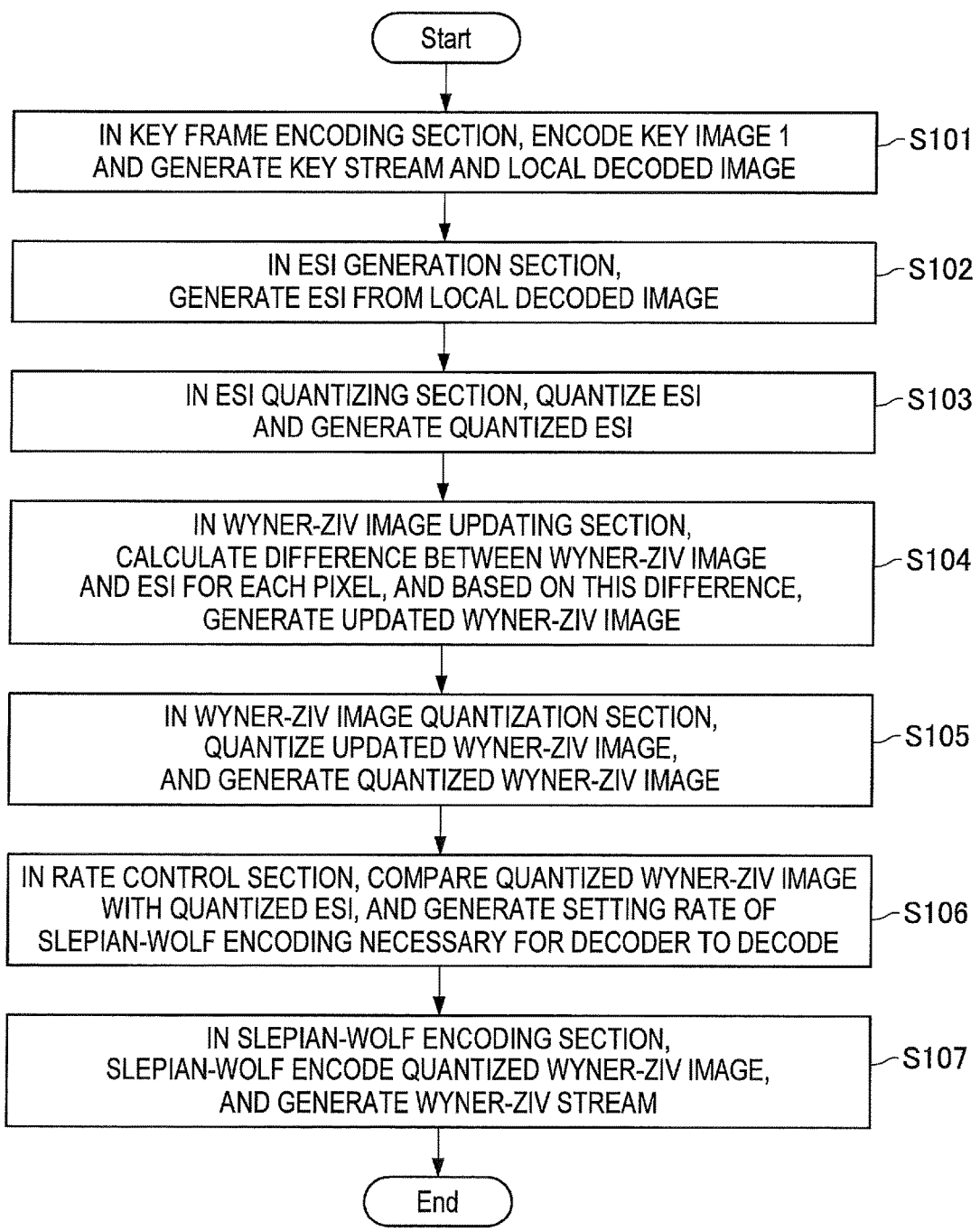
FIG. 4 is a flow chart which shows operations of the video encoding device according to the first embodiment of the present invention.

Here, the operations of an encoding process of the video encoding device 10 will be described by using the flow chart of FIG. 4. Note that the description which uses the flow chart omits the operations of the video decoding device 20 side of the first embodiment.

First, in the key frame encoding section 120, an input key image is acquired from an input video, and a key stream and a local decoded image are generated, based on this input key image (S101).

Then, ESI is generated from the local decoded image, using the ESI generation section 114 (S102). In the present embodiment, while the ESI generation section 114 is described as generating ESI from the local decoded image, an image which becomes the source for generating ESI is not limited to the local decoded image.

Then, in the ESI quantization section 115, the ESI is quantized, and quantized EMI is generated (S103).

Then, the Wyner-Ziv image updating section 111 generates an updated Wyner-Ziv image, based on the input Wyner-Ziv image and the ESI (S104). In the Wyner-Ziv image updating section 111, pixel values of pixels in respective positions are compared with the input Wyner-Ziv image and the ESI, and based on this comparison result, the pixel values adopted in the updated Wyner-Ziv image are determined for the pixels in the respective positions. That is, in the Wyner-Ziv image updating section 111, pixel values of the image of either the input Wyner-Ziv image or the ESI are adopted as the pixel values reflected in the updated Wyner-Ziv image, for the pixel values of pixels in the respective positions. Note that the details of the process which generates the updated Wyner-Ziv image in the Wyner-Ziv image updating section 111 will be described later.

Then, in the Wyner-Ziv image quantization section 112, the updated Wyner-Ziv image is quantized, and a quantized Wyner-Ziv image is generated (S105).

Next, in the rate control section 116, a setting rate (a rate of Slepian-Wolf encoding which the video decoding device 20 may require for decoding), which applies the Wyner-Ziv stream, is determined based on the quantized Wyner-Ziv image and the quantized ESI (S106).

Then, in the Slepian-Wolf encoding section 113, the quantized Wyner-Ziv image is Slepian-Wolf encoded, and a Wyner-Ziv stream based on the setting rate is generated (S107).

Next, the details of the process in which the Wyner-Ziv image updating section 111 generates an updated Wyner-Ziv image, in the above described step S104, will be described.

As described above, in the Wyner-Ziv image updating section 111, pixel values of pixels in respective positions are compared with the input Wyner-Ziv image and the ESI, and based on this comparison result, the pixel values adopted in the updated Wyner-Ziv image are determined for the pixels in the respective positions. Here, a quantization error X, which is generated by the quantized Wyner-Ziv image and the quantized ESI, is used as a parameter for comparing the input Wyner-Ziv image with the ESI.

Specifically, in the Wyner-Ziv image updating section 111, the pixel values of the Wyner-Ziv image are adopted for each pixel in which the "difference between the pixels values of the Wyner-Ziv image and the pixel values of the ESI" is larger than the quantization error X, and the pixel values of the ESI are adopted for each pixel in which the "difference between the pixels values of the Wyner-Ziv image and the pixel values of the ESI" is smaller than the quantization error X.

For example, in the Wyner-Ziv image updating section 111, the pixel values of the input Wyner-Ziv image are adopted for pixels of positions in which the difference between the pixel values of the input Wyner-Ziv image and the pixel values of the EMI is larger than the quantization error X. Further, in the Wyner-Ziv image updating section 111 of the present embodiment, the pixel values of the ESI are adopted for pixels of positions in which the difference between the pixel values of the input Wyner-Ziv image and the pixel values of the EMI is equal to or less than the quantization error X.

The quantization error X is basically a value which is different for each pixel, and while it is desirable to request individually, the quantization error X is processed as an across-the-board value (hereinafter, called a "threshold T") for respective pixels, so as to reduce the computation amount, in the Wyner-Ziv image updating section 111 of the first embodiment. That is, in the Wyner-Ziv image updating section 111, the pixel values adopted in the updated Wyner-Ziv image are determined by a comparison result between the "difference between the pixels values of a Wyner-Ziv image and the pixel values of the ESI" and the threshold T.

While the setting method of the threshold T is not limited, a mean value of the quantization error X of all pixels, for example, may be regarded as half of a quantization step width W, and the threshold T may be set to half of the quantization step width ($T=W/2$). Further, for example, the quantization error X of all pixels may be regarded as a maximum value (quantization step width), and the threshold T may be set to the quantization step width W ($T=W$).

Next, the above described quantization step width W will be described by using FIG. 5A and FIG. 5B.

The quantization step width W is shown in FIG. 5A and FIG. 5B, in the case where the pixel values of each pixel of the updated Wyner-Ziv image and the ESI are in the range of 0-255 (corresponding to 8 bits). As shown in FIG. 5A, if the quantized values of each pixel are expressed by 2 bits, they will become each of the four values of 00, 01, 10, and 11. As shown in FIG. 5A, in the case where the quantized values of each pixel are expressed by 2 bits, the quantization step width W will become 64 when it is expressed by a value of 0-255 (base 10) similar to that prior to quantization. Further, as shown in FIG. 5B, in the case where the quantized values of each pixel are expressed by 3 bits, the quantization step width W will become 32 when it is expressed by a value of 0-255 (base 10) similar to that prior to quantization.

Next, a specific example of the process, in which the Wyner-Ziv image updating section 111 generates an updated Wyner-Ziv image, will be described by using FIG. 6.

FIG. 6 is an example which shows the pixel values of 3 longitudinal pixels×3 lateral pixels (9 pixels), which constitutes an area A1 of the same position for the input Wyner-Ziv image, the ESI, and the updated Wyner-Ziv image, respectively. FIG. 6(a), FIG. 6(b) and FIG. 6(c) show pixel values in the area A1 of the input Wyner-Ziv image, the ESI, and the Wyner-Ziv image, respectively. In FIG. 6, the respective frames of squares are assumed to be one pixel, and the numerals illustrated inside the squares are the pixel values of the pixels. For example, for a pixel PX1 of the area A1, the pixel value in the input Wyner-Ziv image (FIG. 6(a)) is "12", the pixel value in the ESI (FIG. 6(b)) is "13", and the pixel value in the updated Wyner-Ziv image (FIG. 6(c)) is "13". Further, for example, for a pixel PX2 of the area A1, the pixel value in the input Wyner-Ziv image (FIG. 6(a)) is "17", the pixel value in the ESI (FIG. 6(b)) is "24", and the pixel value in the updated Wyner-Ziv image (FIG. 6(c)) is "17".

In FIG. 6 for example, the above described threshold T is assumed to be "5", and an updated Wyner-Ziv image (FIG. 6(c)) is generated. For example, for the pixel PX1 of the area A1, since the pixel value in the input Wyner-Ziv image (FIG. 6(a)) is "12" and the pixel value in the ESI (FIG. 6(b)) is "13", the difference related to the pixel PX1 becomes "1". Therefore, the pixel value "13" of the ESI (FIG. 6(b)) is adopted for the pixel PX1 in the updated Wyner-Ziv image (FIG. 6(c)). Further, for example, for the pixel PX2 of the area A1, since the pixel value in the input Wyner-Ziv image (FIG. 6(a)) is "17" and the pixel value in the ESI (FIG. 6(b)) is "24", the difference related to the pixel PX2 becomes "7". Therefore, the pixel value "17" of the input Wyner-Ziv image (FIG. 6(a)) is adopted for the pixel PX2 in the updated Wyner-Ziv image (FIG. 6(c)).

(A-3) Effect of the First Embodiment

According to the first embodiment, the following effect can be accomplished.

In the video encoding device 10, Slepian-Wolf encoding is performed by using an updated Wyner-Ziv image, which is corrected by using ESI, without using an input Wyner-Ziv image for the Slepian-Wolf encoding as it is. In the Wyner-Ziv image updating section 111, each pixel value of the input Wyner-Ziv image is compared with a quantization error X (threshold T), and according to this comparison result, part of the pixel values is replaced with the pixel values of the ESI. Therefore, the updated Wyner-Ziv image is an image in which a difference with the ESI is smaller than that of the input Wyner-Ziv image. Then, the rate controlling section 116 compares the above described quantized Wyner-Ziv image (an image in which the updated Wyner-Ziv image has been quantized) with the quantized ESI, and the amount of codes necessary for estimating and correcting an error of the quantized ESI is calculated as a setting rate. In the rate controlling section 116, the setting rate (small amount of codes) is set, in which the error to be corrected gets smaller and a calculation result decreases as the difference between the quantized ESI and the image to be compared (quantized value sequence) gets smaller. Further, in the rate controlling section 116, the setting rate is calculated by using the quantized Wyner-Ziv image based on the updated Wyner-Ziv image, in which the difference with the EMI is smaller than that of the input Wyner-Ziv image. Therefore, in the rate controlling section 116 of the first embodiment, a setting rate equal to or below that of the existing method (in the case where the setting rate is calculated by using quantization of the input Wyner-Ziv image as it is) becomes output as a calculation result.

Then, in the Wyner-Ziv image updating section 111, as described above, the pixel values of the Wyner-Ziv image are adopted for pixels in which the "difference between the pixels values of the Wyner-Ziv image and the pixel values of the ESI" is larger than the quantization error X, and the pixel values of the ESI are adopted for pixels in which the "difference between the pixels values of the Wyner-Ziv image and pixel values of the ESI" is smaller than the quantization error X. As described above, the updated Wyner-Ziv image is corrected so that a difference with the ESI becomes less than that of the input Wyner-Ziv image. However, the corrected pixels in the updated Wyner-Ziv image are only those pixels with a difference smaller than that of the quantization error X. Therefore, in the case where a change between the input Wyner-Ziv image and the updated Wyner-Ziv image is observed in a pixel unit (parameter unit), this change is maintained in the range of the quantization error X.

On the other hand, in the Slepian-Wolf encoding section 113, parity bits are generated to obtain a quantized Wyner-Ziv image by correcting an error of the quantized ESI. As described above, a quantized error X is included in the quantized Wyner-Ziv image and the quantized ESI. Therefore, if the difference between the input Wyner-Ziv image and the updated Wyner-Ziv image is obtained in the range of the quantization error X, the result of an error correction by the parity bits generated by the Wyner-Ziv encoding section 110 will have an accuracy of the same level as compared to the case where the input Wyner-Ziv image performs Wyner-Ziv encoding as it is. That is, even for the case where the updated Wyner-Ziv image is used for Wyner-Ziv encoding, or for the case where the input Wyner-Ziv image is used for Wyner-Ziv encoding as it is, such as that of the video encoding device 10 of the present embodiment, the decoding quality obtained at the video decoding device 20 side will be at the same level.

However, in the first embodiment, even in the case where the updated Wyner-Ziv image is actually used in Wyner-Ziv encoding, the decoding quality obtained at the video encoding device 20 side performs verification of whether or not it is at the same level, since the quantization error X of each pixel is regarded as the threshold T (for example, a value of half of the quantization step width of the ESI) and is applied across-the-board. Hereinafter, a verification result related to the effect of the first embodiment will be described by using FIGS. 7 and 8.

An example which performs Slepian-Wolf encoding by quantizing the input Wyner-Ziv image as it is, in the same way as that of the technology in the related art, is shown in FIG. 7. On the other hand, an example which performs encoding by the video encoding device 10 of the first embodiment (in the case where encoding is used by quantizing the updated Wyner-Ziv image) is shown in FIG. 8. Further, in order to aid understanding in FIGS. 7 and 8, each image (the input Wyner-Ziv image, the updated Wyner-Ziv image and the ESI) is assumed to be an image constituted of a pixel sequence (1×3 pixel sequence) by the three pixels PX1-PX3.

Then, in FIGS. 7 and 8, the pixel values of the pixels PX1-PX3 of a pixel sequence α, which constitutes the input Wyner-Ziv image, are 79, 114 and 164 (base 10), respectively. Further, in FIGS. 7 and 8, each of the pixel values of a pixel sequence β, which constitutes the ESI, are 97, 129 and 188, respectively. Note that in FIGS. 7 and 8, each of the pixel values of the pixel sequence α and the pixel sequence β are shown as 0-255 (base 10).

Next, a mean error (decoding quality) in the case where a decoding process is performed at the video decoding device 20 side, by using a necessary amount of codes in the case where Slepian-Wolf encoding is performed, and the codes (parity bits) generated by the Wyner-Ziv encoding section 110, will be described for the respective examples of FIGS. 7 and 8.

First, a necessary amount of codes in the case where Slepian-Wolf encoding is performed will be described in the example of FIG. 7. In the example of FIG. 7, a quantized value sequence γ1, in which the pixel sequence β is quantized by a quantization bit number of 2 bits, is used as the quantized ESI. In FIG. 7, each of the quantized values of the quantized value sequence γ1, which is quantized by a quantization bit number of 2 bits, are 01, 10 and 10 from the front (base 2).

Further, as shown in FIG. 7, the pixel values of the pixels PX1-PX3 of the quantized value sequence δ (quantized Wyner-Ziv image), in which each pixel value of the pixel sequence of the Wyner-Ziv image α is quantized by a quantization bit number of 2 bits, are 01, 01 and 10 (base 2), respectively.

Then, the information amount necessary for correcting a prediction error, which is generated between the quantized value sequence γ1 (ESI) quantized by a quantization bit number of 2 bits, and the quantized value sequence δ (input Wyner-Ziv image), can be requested if a conditional entropy from the bit error probability between the quantized value sequence γ1 (ESI) and the quantized value sequence δ (input Wyner-Ziv image) is calculated, and the bit number of the quantization sequence δ is multiplied. In this case, since a bit error number between the quantized value sequence γ1 (ESI) and the quantized value sequence δ (input Wyner-Ziv image) is 2 out of 6, the bit error probability is 2/6.

Then, a conditional entropy "−plog(p)−(1−p)log(1−p)", when p is assumed to be the bit error probability, is requested from this bit error probability, and becomes 5.5 bits when the bit number 6 of the quantization sequence δ is multiplied. That is, in the example of FIG. 7, if there is no amount of codes (parity bits) of 5.5 bits, the quantized Wyner-Ziv image is not able to be obtained from the quantized ESI.

Next, the mean error in the example of FIG. 7 will be described.

Here, Slepian-Wolf decoding has been successful in the video decoding device 20, and the corrected quantized values, which the Wyner-Ziv decoding section 210 has output, are assumed to be identical to the quantized value sequence δ (Wyner-Ziv image). In this case, some proposals for methods which reconfigure an image (process methods of the image reconfiguration section 212) from the corrected quantized values, such as that of Non-Patent Literature 4, for example, are methods in which the DSI is assumed to be the reconfiguration result, if the corrected quantized values are the same as the values obtained by quantizing the DSI, and are methods in which the values closest to the DSI among the quantization sections are made a configuration result, in the case where the corrected quantized values are different. Note that in the examples of FIGS. 7 and 8, the DSI is assumed to be identical to the ESI, in order to aid understanding.

Then, in the example of FIG. 7, the pixel values of each pixel, which constitutes a pixel sequence ε1 of the reconstructed image generated by the video decoding device 20, are 97, 128 and 188 (base 10). In this case, when the mean error between ε1 and the pixel sequence of the original image α (input Wyner-Ziv image) is requested (mean value of the difference between the pixel values of each pixel), it will become 18.7.

Next, the example of FIG. 8 will be described.

Note that in the example of FIG. 8, a quantized value sequence γ2, which the pixel sequence β represents by a quantization bit number of 3 bits, is used as the quantized ESI. In FIG. 8, each quantized value of the quantized value sequence γ, which is quantized by a quantization bit number of 2 bits, is 011, 100 and 101 (base 2) from the front. In the examples of FIG. 7 and FIG. 8, when the quantization bit numbers applied to the ESI are assumed to be identical, the amount of codes necessary for error correction is reduced, a result is obtained in which the mean error increases, and the effect of the present invention becomes difficult to understand. Accordingly, in FIG. 8, the quantization bit number is assumed to be 3 bits, and it is verified that the mean error of the same level as that of the example of FIG. 7 can be achieved by a smaller amount of codes.

Firstly, a difference between the pixel values of the Wyner-Ziv image (pixel sequence α) and the ESI (pixel sequence β) is calculated. In FIG. 8, the difference between only the pixel values of the pixel PX2 from the front is 15, which is smaller than half of the quantization step width (2^(8−3)/2=16). Therefore, in a pixel sequence of the updated Wyner-Ziv image ζ in the example of FIG. 8, only the pixel PX2 is corrected to the pixel values of the ESI, and these pixel values become 79, 129 and 164 (base 10) from the front.

Next, in the example of FIG. 8, the amount of codes necessary in the case where Slepian-Wolf encoding is performed will be described.

As shown in FIG. 8, the three quantized values of the quantized value sequence γ2, in which the pixel sequence of the ESI β is quantized by a quantization bit number of 3 bits, becomes 011, 100 and 101 (base 2) from the front.

Further, the three quantized values of the quantized value sequence η, in which the pixel sequence of the updated Wyner-Ziv image ζ is quantized by a quantization bit number of 3 bits, becomes 010, 100 and 101 (base 2) from the front.

Then, an information amount necessary for correcting a prediction error, which is generated between the quantized value sequence γ2 quantized by a quantization bit number of 3 bits (quantized ESI) and the quantized value sequence η (quantized Wyner-Ziv image), can be requested if a conditional entropy, requested from a bit error probability between the quantized value sequence γ2 (quantized ESI) and the quantized value sequence η (quantized Wyner-Ziv image), is calculated. In this case, since a bit error number between the quantized value sequence γ2 (ESI) and the quantized value sequence η (updated Wyner-Ziv image) is 1 out of 9, the bit error probability is 1/9.

Then, a conditional entropy "−p log(p)−(1−p)log(1−p)", when p is assumed to be the bit error probability, is requested from this bit error probability, and becomes 4.5 bits when the bit number 9 of the quantization sequence δ is multiplied. That is, in the example of FIG. 8, if there is no amount of codes (parity bits) of 4.5 bits, the quantized Wyner-Ziv image is not able to be obtained from the quantized ESI.

Next, the mean error in the example of FIG. 8 will be described.

Here, Slepian-Wolf decoding has been successful in the video decoding device 20, and an image based on the corrected quantized values, which the Wyner-Ziv decoding section 210 has output, is assumed to be identical to the image of the quantized value sequence η (quantized Wyner-Ziv image). In this case, methods similar to those of FIG. 7 described above are used, from the corrected quantized values, as methods which reconfigure an image (process methods of the image reconfiguration section 212).

In this case, in the example of FIG. 8, the pixel values of each pixel, which constitutes a pixel sequence ε2 of the reconstructed image generated by the video decoding device 20, are 97, 128 and 188 (base 10) from the front. In this case, when the mean error between ε2 and the pixel sequence of the original image α (Wyner-Ziv image) is requested (mean value of the difference between the pixel values of each pixel), it will become 18.7.

When the above described calculation result is collected, in the case where the technology of the existing method shown in FIG. 7 is used, an amount of codes of 5.5 bits is necessary for achieving a mean error of 18.7, while in contrast in the first embodiment, only 4.5 bits is necessary for achieving an identical mean error of 18.7. That is, even if a value of half of the quantization step width of the ESI is regarded as the mean error, and is applied as a threshold T for generating an updated Wyner-Ziv image, such as in the first embodiment, it can be seen that an equal decoding quality can be achieved by an amount of codes smaller than that of the existing method.

According to the first embodiment as described above, the amount of codes can be decreased without a decline in the quality of a decoded image, by preventing an increase of the amount of codes intended for pixels with a small image quality improvement amount per amount of codes.

(B) The Second Embodiment

Hereinafter, a second embodiment of a video encoding device and program, a video decoding device and program, and a video distribution system according to the present invention will be described in detail while referring to the figures.

The first embodiment showed an example of the video decoding device 20 which performs Slepian-Wolf decoding by using only DSI. However, in the case where the content is different for DSI and ESI (for example, the generation method of the quantization bit number is different), there are cases where side effects (adverse effects) of using the updated Wyner-Ziv image in Slepian-Wolf encoding will occur in the video encoding device 10.

Normally in a video distribution system of a DVC method, there are many cases where a decrease of a calculation amount, which accompanies encoding, takes priority over a prediction accuracy of SI at the video encoding device side, while in contrast the prediction accuracy of SI takes priority over the decrease of a computation amount of the decoding at the video decoding device side. Accordingly, in the video distribution system of the existing method, it is often the case that the SI generated at the video decoding device side (DSI) has contents with a higher quality than that of the SI generated at the video encoding device side (ESI).

Hereinafter, side effects which may possibly occur in the first embodiment will be described by using FIG. 9.

Figure 9:
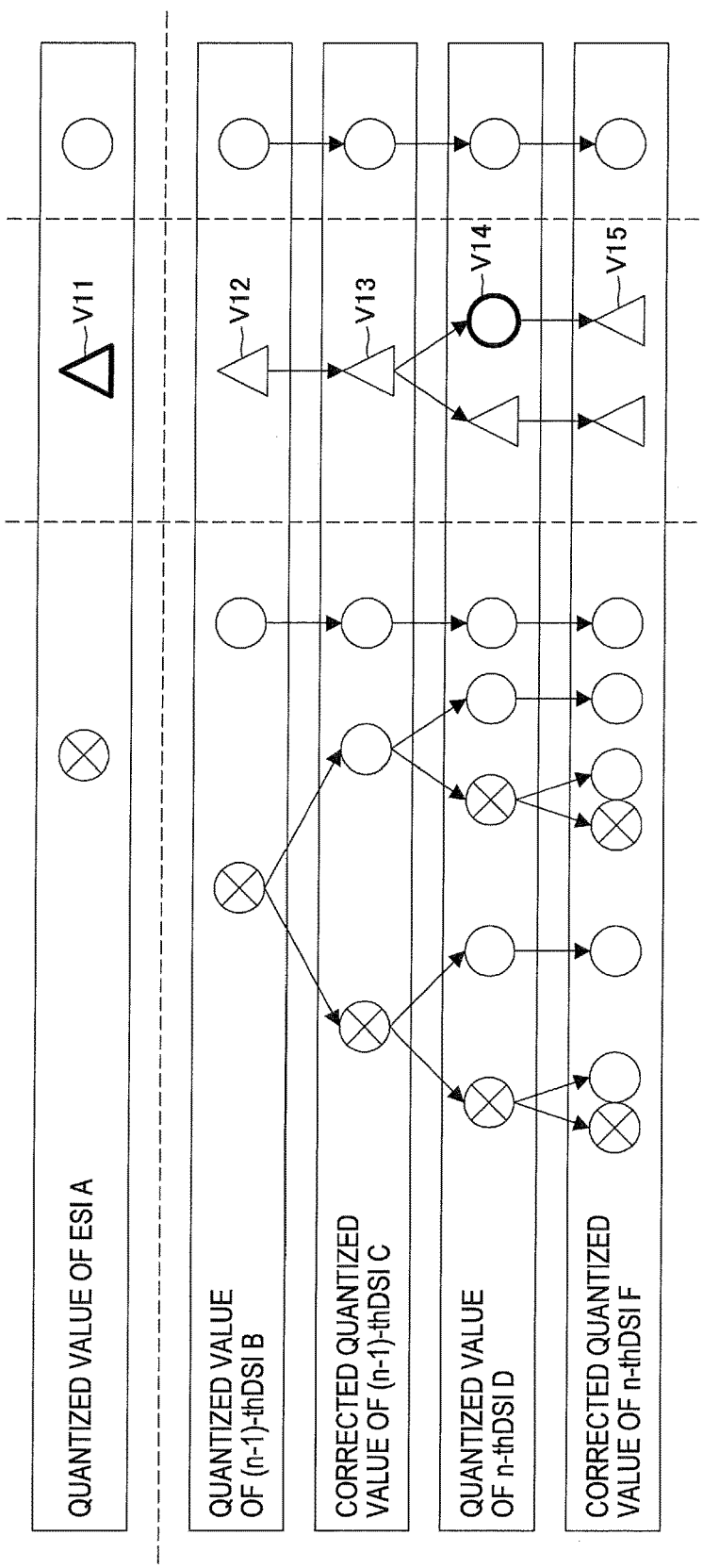
FIG. 9 is an explanatory diagram which shows operations, in the case where they are generated by the video decoding device, according to the first embodiment of the present invention.

Transition routes of the respective evaluation results related to (A) quantized values of ESI for arbitrary pixels, (B) quantized values of DSI generated n−1 times (hereinafter, expressed as "(n−1)-thDSI"), (C) quantized values of the corrected (n−1)-thDSI (corrected by the Slepian-Wolf decoding section 211), (D) quantized values of DSI generated n times (hereinafter, expressed as "n-thDSI"), and (F) quantized values of the corrected n-thDSI, are represented in FIG. 9 by a tree structure.

In FIG. 9, marks of circles marks show the cases where each quantized value (A-D, F) is equal to those of the original image (quantized values of the input Wyner-Ziv image). Further in FIG. 9, X marks (marks of X in the frames of circles) show the cases where each quantized value (A-D, F) is different from those of the original image (quantized values of the input Wyner-Ziv image). In addition in FIG. 9, marks of triangles show the cases where each quantized value (A-D, F) is different from those of the original image (quantized values of the input Wyner-Ziv image), and is equal to the quantized values of the updated Wyner-Ziv image in the video encoding device 10.

The evaluation result (either an X, triangle, or circle from the left) of the quantized value of the ESI A is set as a starting point, and the route which the evaluation values transit in the order of quantized values B, C, D and F, is shown in FIG. 9 by a tree structure.

Here, as shown in FIG. 9, a route for an arbitrary pixel will be described, in the case where an evaluation result of the quantized value of the ESI A (evaluation result V11 of FIG. 9), and an evaluation result of the corrected quantized value of the (n−1)-thDSI C, are both marked as triangles (that is, in the case where A=C). Then, afterwards in this route, a higher quality (the average quality of the overall image is high-quality) DSI is generated in the video decoding device 20, a quantized value of the n-thDSI D is obtained for the pixel, and this evaluation result will be marked as a circle (evaluation result V14 of FIG. 9). However, in this case, while the quantized value of the n-thDSI D is supposed to be in principle equal to the value of the original image (the input Wyner-Ziv image), the evaluation result at the stage of the corrected quantized value of the n-thDSI F will be marked as a triangle (evaluation result V 15 of FIG. 9), in order to recognize and correct errors for the Wyner-Ziv decoding section 210 of the video decoding device 20 side. As described above in the first embodiment, there are cases where the error number in the Wyner-Ziv image will increase for pixels in which "A=C and C≠D". Such an increase of the error number in the Wyner-Ziv decoded image may cause a decrease in the decoding quality, since the probability of the Slepian-Wolf decoding failing will increase.

Note that FIG. 9 is shown under the assumptions of "in the case where the quantized value of the DSI is marked as a triangle or a circle, the calculated quantized value of the DSI also becomes a triangle or a circle", and "in the case where the quantized value of the (n−1)-thDSI B is marked as a triangle or a circle, and where the corrected quantized value of the (n−1)-thDSI C is marked as a triangle or a circle, the quantized value of the n-thDSI D also becomes a triangle or a circle". Accordingly, in the second embodiment, the problem such as described above is solved by performing a process which uses ESI at the video decoding device side.

(B-1) Configuration of the Second Embodiment

The overall configuration of a video distribution system 1A of the second embodiment can be shown by using the above described FIG. 2. Hereinafter, the differences with the first embodiment will be described for the second embodiment.

The second embodiment is different to the first embodiment in that the video decoding device 20 is replaced with a video decoding device 20A.

Figure 10:
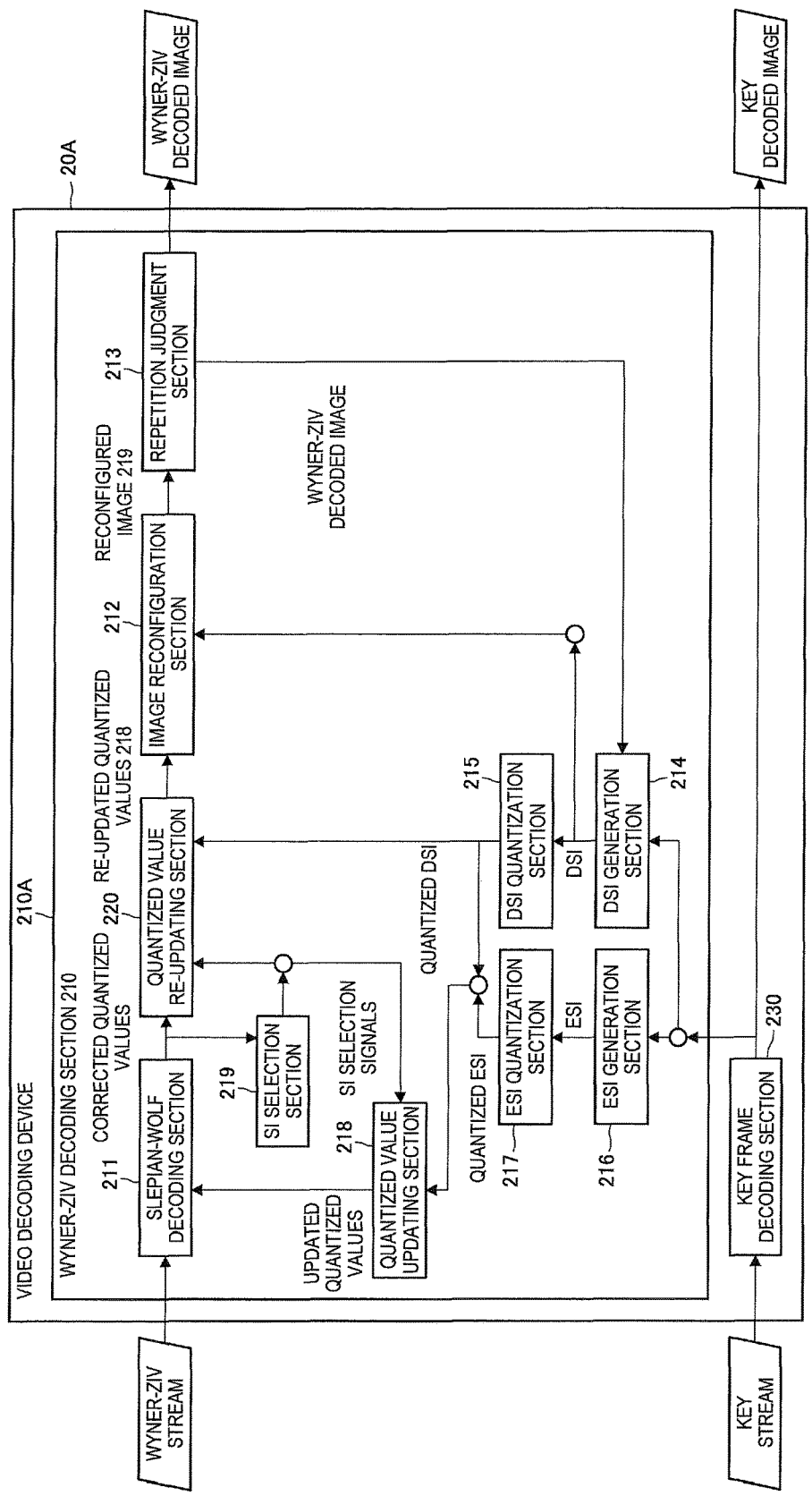
FIG. 10 is a block diagram which shows a functional configuration of a video decoding device according to the second embodiment of the present invention.

FIG. 10 is a block diagram which shows an internal configuration of the video decoding device 20A according to the second embodiment.

The video decoding device 20A of the second embodiment is different to that of the first embodiment in that the Wyner-Ziv decoding section 210 is replaced with a Wyner-Ziv decoding section 210A.

Then, the Wyner-Ziv decoding section 210A is different to that of the first embodiment in that an ESI generation section 216, an ESI quantization section 217, a quantized value updating section 218, a SI selection section 219, and a quantized value re-updating section 220, are added.

The ESI generation section 216 generates ESI, similar to that of the video encoding section 10 side, from a key decoded image.

The ESI quantization section 217 quantizes ESI, and generates quantized ESI.

The SI selection section 219 generates SI selection signals for selecting a quantized value for each pixel, from one of the corrected quantized values, the quantized ESI, or the quantized DSI. The details of the SI signals will be described later.

The quantized value updating section 218 generates updated quantized values (a sequence of quantized values) from the quantized ESI and the quantized DSI, based on the SI selection signals. The details of the updated quantized values will be described later.

The quantized value updating section 220 generates re-updated quantized values (a sequence of quantized values) from the corrected quantized values and the quantized DSI, based on the SI selection signals. The details of the re-updated quantized values will be described later. Then, the re-updated quantized values are used for the generation of a reconfigured image of the image supplied to the image reconfiguration section 212.

Then, in the Slepian-Wolf decoding section 211 of the second embodiment, a prediction error included in the updated quantized values is corrected by using a Wyner-Ziv stream, and a process which generates corrected quantized values is performed.

(B-2) Operations of the Second Embodiment

Next, the operations of the video distribution system 1A of the second embodiment, which has a configuration such as that described above, will be described.

Figure 11:
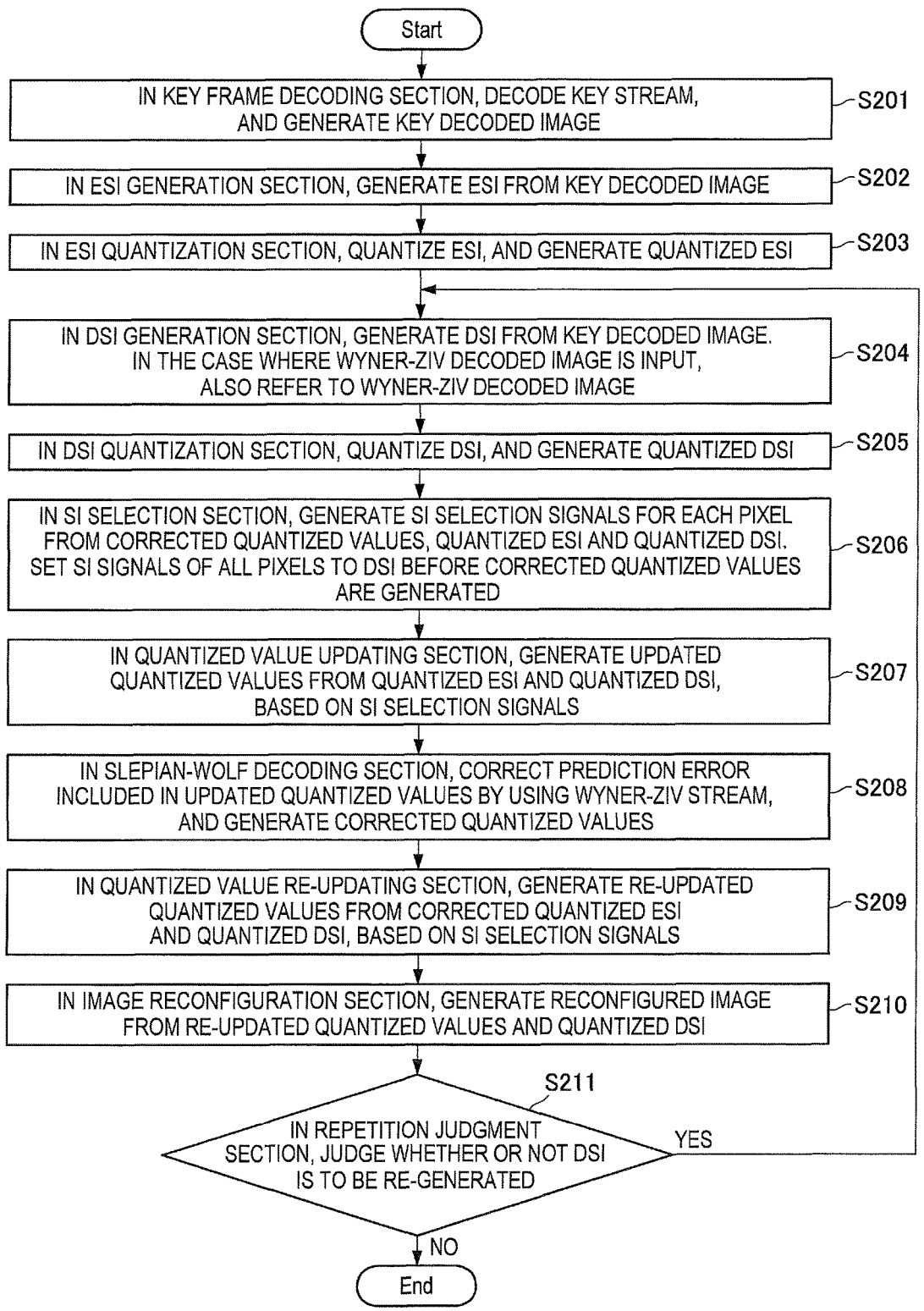
FIG. 11 is a flow chart which shows operations of the video decoding device according to the second embodiment of the present invention.

First, the operations of the decoding process of the video decoding device 20A will be described by using the flow chart of FIG. 11.

First, in the key frame decoding section 230, a decoding process of the key stream is performed, key decoding is performed, and a key decoded image is generated (S201).

Then, in the ESI generation section 216, ESI is generated from the key decoded image (S202).

Then, in the ESI quantization section 217, the ESI is quantized, and quantized ESI is generated (S203).

Then, in the DSI generation section 214, DSI is generated from the key decoded image (S204). Note that in the case where a Wyner-Ziv decoded image is input to the DSI generation section 214, DSI is generated by also referring to the Wyner-Ziv decoded image.

Then, in the DSI quantization section 214, the DSI is quantized, and quantized DSI is generated (S205).

Then, in the SI selection section 219, SI selection signals for each pixel are generated from the corrected quantized values, the quantized ESI and the quantized DSI (S206). The SI selection section 219 outputs control signals, which select quantized values of the ESI side (quantized values of the quantized ESI) as the SI selection signals for pixels in which the values are equal in the quantized ESI and the corrected quantized values, and also in which the quantized values are different in the corrected quantized values and the quantized DSI, and also outputs designation signals, which select the quantized values of the DSI side (quantized values of the quantized DSI) as the SI selection signals for the other pixels. Note that the SI selection section 219 outputs the designation signals, which select the quantized values of the DSI side, as the SI selection signals in all the pixels, before the corrected quantized values are generated.

Further, in the case where it is predicted that the amount of codes of Slepian-Wolf encoding is small, and the probability to which the prediction error can be properly corrected is low, the SI selection section 219 may generate SI selection signals, by using the above described condition for the pixels to which it is judged that the quality of EMI is higher than a predetermined threshold, and may designate the quantized values of the DSI side as the SI selection signals for the pixels to which it is judged that the quality of ESI is lower than the predetermined threshold (the reasons will be described later). In this case, it is necessary for the ESI generation section 216 and the ESI quantization section 217 to output by adding information, which evaluates the quality of the ESI for each pixel, in the ESI and the quantized ESI. For example, a method which is performed by the cost of a movement vector, calculated when the ESI is generated, may be applied as an evaluation method of the ESI. Additionally, in the case where there is a scalable structure, such as that of Non-Patent Literature 3, for example, a method which evaluates the quality of the ESI may be applied, by comparing the decoding result of the base layer with the ESI.

Then, in the quantized value updating section 218, updated quantized values are generated from the quantized ESI and the quantized DSI, based on the SI selection signals (S207).

The quantized value updating section 218 sets the quantized values of the ESI side to the updated quantized values for pixels in which the quantized values of the ESI side have been designated by the SI selection signals, and sets the quantized values of the DSI side to the updated quantized values for pixels in which the quantized values of the DSI side have been designated by the SI selection signals.

Then, the Slepian-Wolf decoding section 211 corrects the prediction error included in the updated quantized values by using the Wyner-Ziv stream, and generates corrected quantized values (S208).

Then, re-updated quantized values are generated from the corrected quantized values and the DSI based on the SI selection signals, by the quantized value re-updating section 220 (S209).

The quantized value re-updating section 220 generates re-updated quantized values, by substituting the quantized values of the quantized DSI for pixels in which the quantized values of the ESI side have been designated by the SI selection signals, and by substituting corrected quantized values for pixels in which the quantized values of the DSI side have been designated by the SI selection signals. In other words, the quantized value re-updating section 220 generates re-updated quantized values for the corrected quantized values, by performing an update which replaces only pixels in which the quantized values of the ESI side have been designated by the SI selection signals with the quantized values of the quantized DSI.

Then, in the image reconfiguration section 212, a re-configured image is generated from the re-updated quantized values and the quantized DSI (S210).

Then, after the processes of steps S204-S209 described above are completed for one image (frame), in the repetition judgment section 213, it is judged whether or not the DSI is to be re-generated (S211), and in the case where it is judged that the DSI is to be re-generated, the Wyner-Ziv decoding section 210A operates from the above described step S204.

On the other hand, in the case where it is judged by the above described step S211 that the DSI is not to be re-generated, the Wyner-Ziv decoding section 210A outputs the latest generated reconfigured image as the Wyner-Ziv decoded image.

Next, solving the above described problem in the video decoding device 20A will be described.

Figure 12:
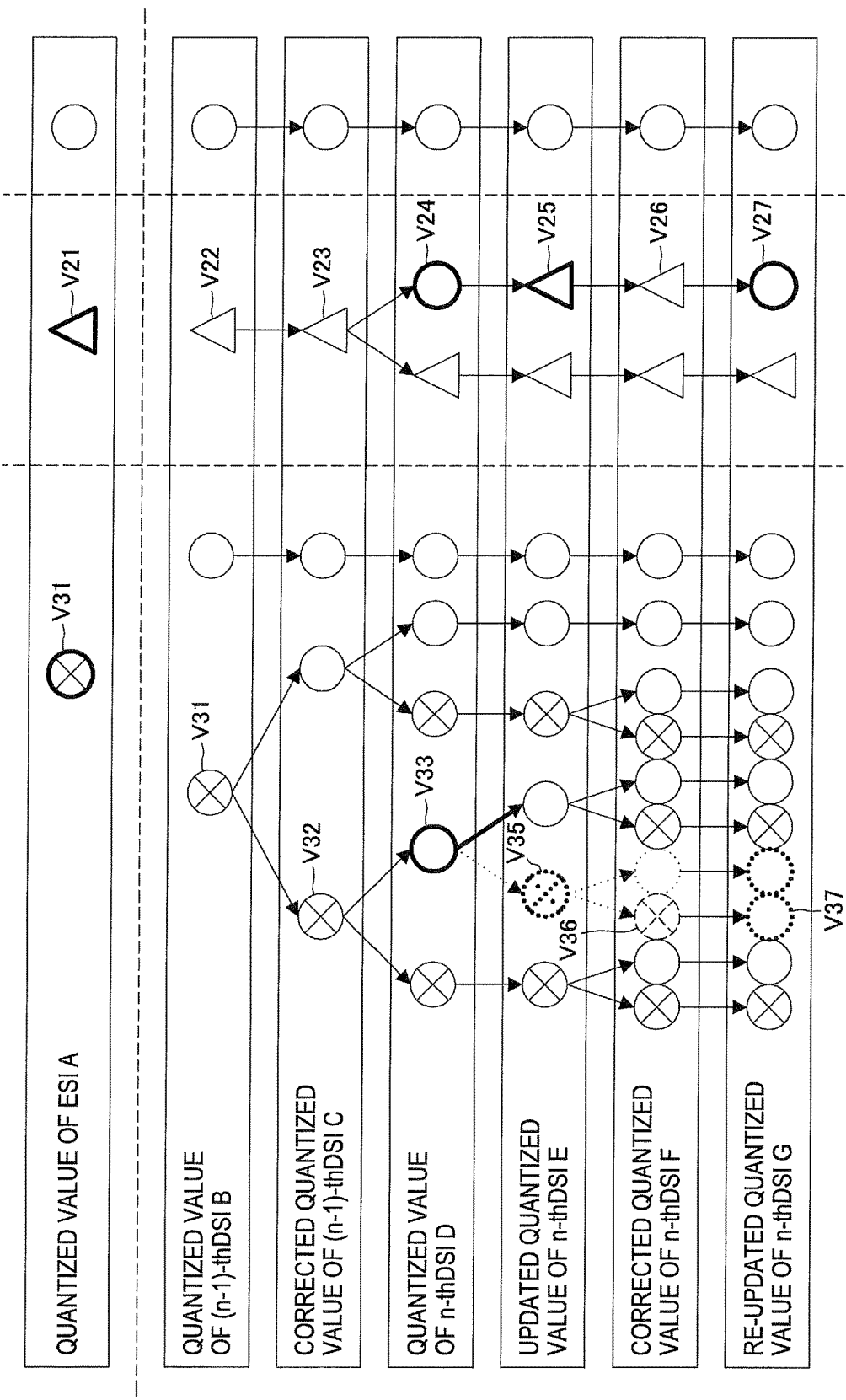
FIG. 12 is an explanatory diagram which shows the effect of the second embodiment of the present invention.

FIG. 12 is an explanatory diagram which shows, in a form similar to that of FIG. 9 described above, an evaluation result of each quantized value generated in the video decoding device 20A.

In FIG. 12 compared to FIG. 9 described above, the stages (rows) of the updated quantized value of the n-thDSI E (quantized values that the quantized value updating section 218 outputs), and the re-updated quantized value of the n-thDSI G (quantized values that the quantized value re-updating section 220 outputs) are added. The contents, in which the evaluation result (a circle, X or triangle) is shown according to E and G are similar to those of FIG. 9 described above.

Then, in FIG. 12, the transition routes of the evaluation result of pixels in which "A=C and C≠D" become the routes of the evaluation result V21 of A (triangle), the evaluation result V22 of B (triangle), the evaluation result V23 of C (triangle), and the evaluation result V24 of D (circle). Then, in the second embodiment (FIG. 14), the evaluation result becomes a triangle (evaluation result V26) at the stage of the corrected quantized value of the n-thDSI F, similar to the case of the first embodiment (in the case of FIG. 9), for pixels in which "A=C and C≠D". However, in the second embodiment, the evaluation result of the re-updated quantized value of the n-thDSI G, which is finally output, can be made a circle (evaluation result V27), since the quantized values of the pixels are replaced with the quantized value of the ESI A, by a correction from the quantized value re-updating section 220.

Therefore, as shown in FIG. 12, for pixels which satisfy "A=C and C≠D", an error number increase can be prevented when viewed from the Slepian-Wolf encoding, by replacing the quantized values of pixels with values similar to the quantized value of the ESI A, in the quantized value updating section 218.

In addition, in the quantized value re-updating section 220, the evaluation result of the final output can be made a circle, by replacing the quantized values of pixels with the quantized value of the n-thDSI D.

Further, as described above, in the quantized value updating section 218 and the quantized value re-updating section 220, there are cases where an effect, such as that described below, occurs by performing an update of the quantized values. This is because the routes of the evaluation results V31-V34 shown in FIG. 12 exist, in addition to the routes of the evaluation results V21-V24 shown in FIG. 12, as pixels which satisfy "A=C and C≠D". In the routes of the evaluation results V31-V34 shown in FIG. 12, the evaluation result of the quantized value of the ESI A is an X (evaluation result V31), the evaluation result of the corrected quantized value of the (n−1)-thDSI C is an X (evaluation result V32), and the quantization result of the quantized value of the n-thDSI D is marked as a circle (evaluation result V34).

Figure 14:
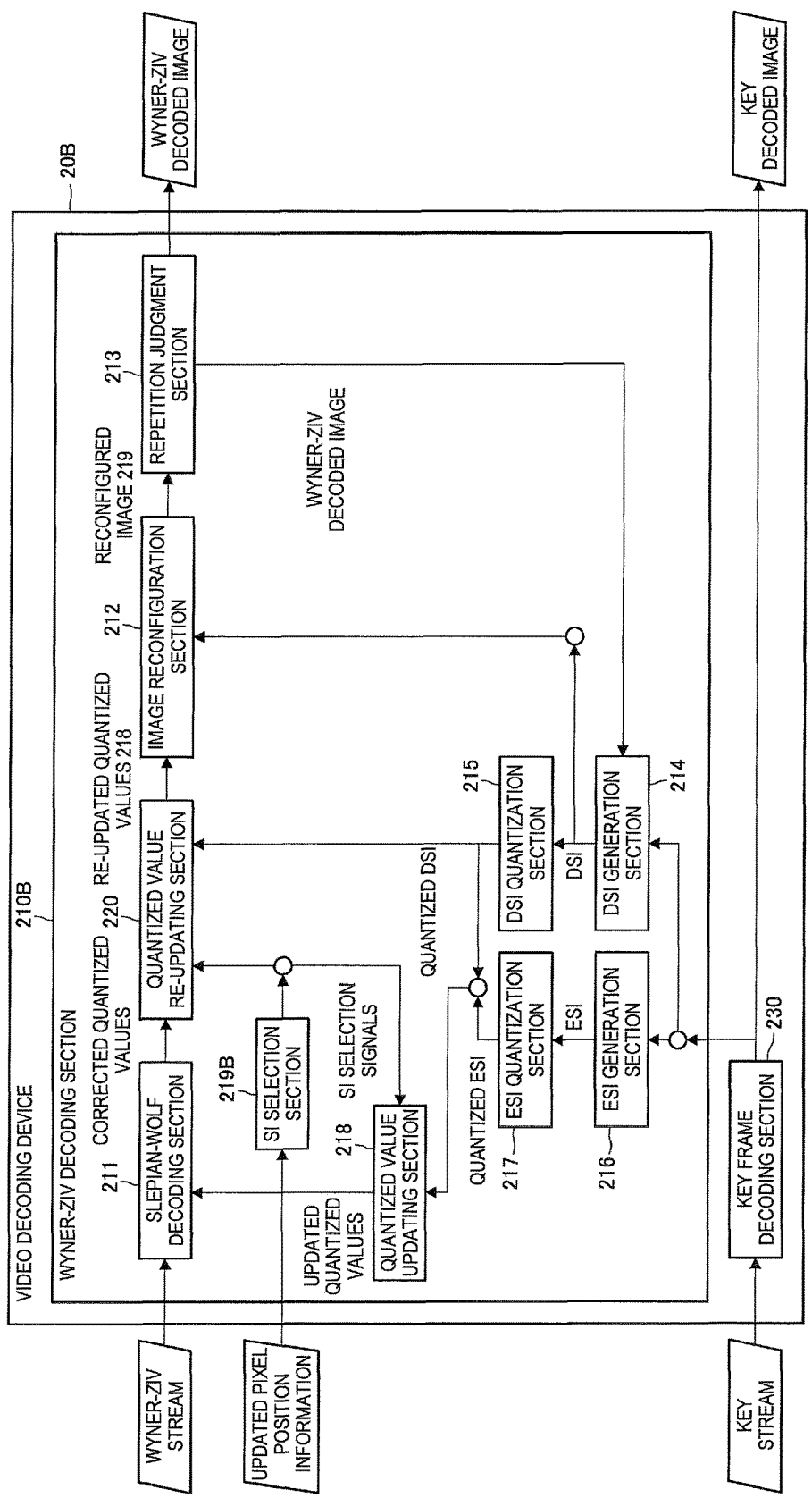
FIG. 14 is a block diagram which shows a functional configuration of a video decoding device according to the third embodiment of the present invention.

However, in the routes of the above described evaluation results V31-V34, the corrected quantized value of the (n−1)-thDSI C is a value which is corrected by Slepian-Wolf decoding, and even if all the bits are not properly decoded, for example, there is enough of a possibility that part of the bits are properly decoded, and there is a low possibility that an equation is established between the quantized value of the ESI A and the corrected quantized value of the (n−1)-thDSI C. Then, in the case where an equation is not established between the quantized value of the ESI A and the corrected quantized value C, side effects will not occur, since the above condition is not satisfied. In part, while pixels which satisfy the condition of "A=C" occur in the transition routes of the evaluation results V31-V34, the effect is small even for these pixels, so that the evaluation result (evaluation result V37) of the n-th re-updated quantized value G returns to a circle, such as shown in FIG. 14.

Further, the amount of codes of Slepian-Wolf encoding is expected to be insufficient, and the influence of the above described side effects becomes stronger in the updated quantized value E, by a condition such as a correction failure generated with a high probability. In such a condition, as described in the above described step S206, in the case where it is predicted that the amount of codes of Slepian-Wolf encoding is small, and the probability to which the prediction error can be properly corrected is low, it is effective to designate DSI as the SI selection signals by the SI selection section 219, for pixels in which it is judged that the quality of the ESI is higher than a predetermined threshold. As shown in FIG. 12, pixels which generate the above described side effects are pixels in which the evaluation result of the quantized values of ESI is an X. Pixels in which it is judged that the quality of the ESI is bad have a high possibility of the quantized value of the ESI A being an X, and the generation of the above described side effects can be prevented by applying the above condition to such pixels.

(B-3) Effect of the Second Embodiment

According to the second embodiment, in addition to the effect of the first embodiment, the following effect can be accomplished.

According to the second embodiment as described above, an error increase for Slepian-Wolf encoding can be prevented, a high-quality decoding result of a re-generated SI can be reflected in the output, and the decoding quality can be improved.

(C) The Third Embodiment

Hereinafter, a third embodiment of a video encoding device and program, a video decoding device and program, and a video distribution system according to the present invention will be described in detail while referring to the figures.

(C-1) Configuration of the Third Embodiment

The overall configuration of a video distribution system 1B of the third embodiment can be shown by using the above described FIG. 2. Hereinafter, the differences with the second embodiment will be described for the third embodiment.

The third embodiment is different to the second embodiment in that the video encoding device 10 and the video decoding device 20A are replaced with a video encoding device 10B and a video decoding device 20B.

Figure 13:
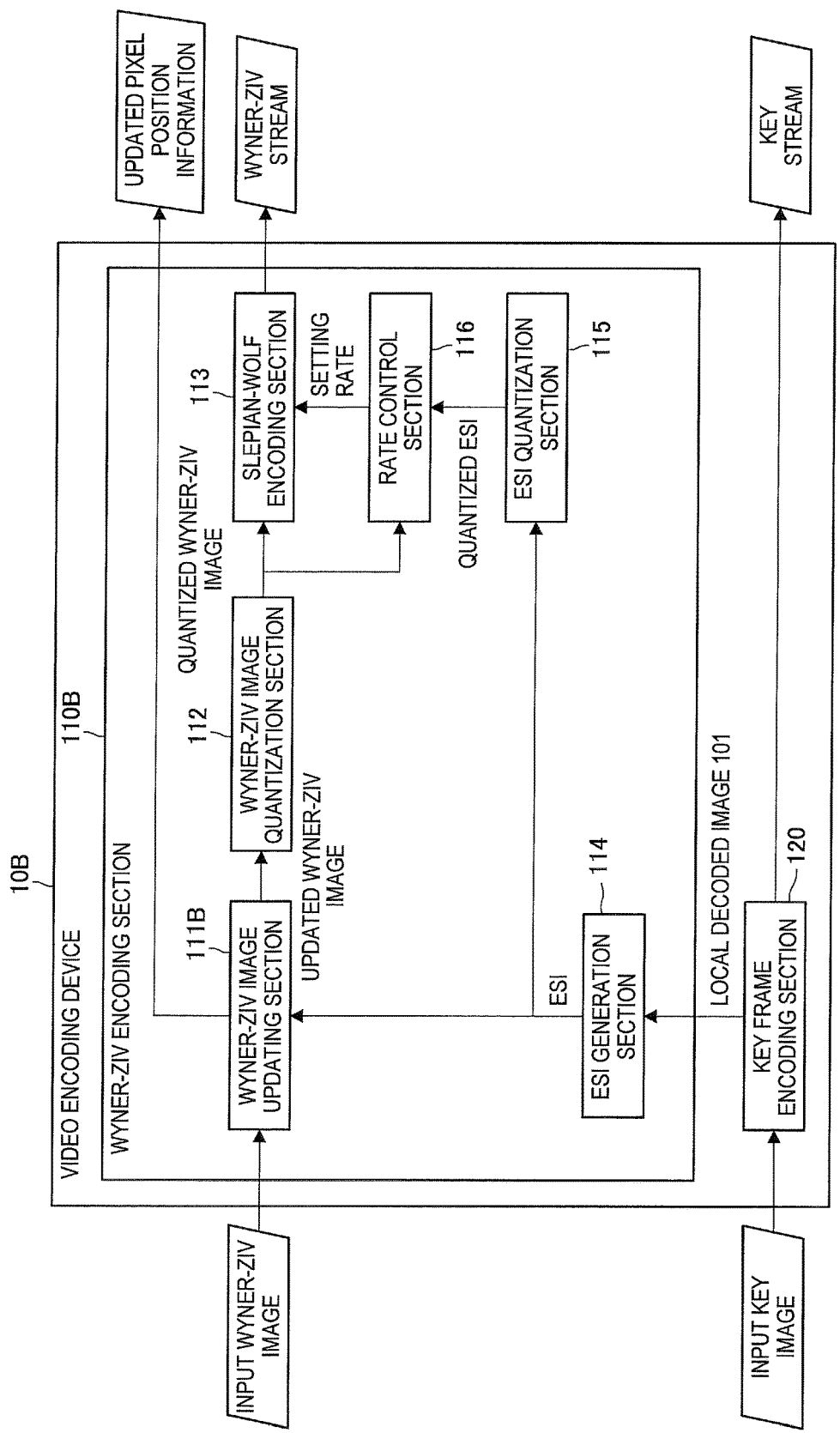
FIG. 13 is a block diagram which shows a functional configuration of a video encoding device according to the third embodiment of the present invention.

FIG. 13 is a block diagram which shows an internal configuration of the video encoding device 10B according to the third embodiment.

The video encoding device 10B is different to that of the second embodiment in that the Wyner-Ziv encoding section 110 is replaced with a Wyner-Ziv encoding section 110B. Further, the Wyner-Ziv encoding section 110B is different to that of the second embodiment in that the Wyner-Ziv image updating section 111 is replaced with a Wyner-Ziv image updating section 111B.

The Wyner-Ziv image updating section 111B generates information which shows the position of pixels in which the quantized values of the ESI side are adopted (hereinafter, called "updated pixel position information"), when an updated Wyner-Ziv image is generated. While the form of the updated pixel position information is not limited, it may include, for example, a list of identification information (for example, coordinates, sequence numbers, or the like), for specifying pixels (specifying parameters) in which the quantized values of the ESI side are adopted, in the updated Wyner-Ziv image. Then, in the video encoding device 10B, the updated pixel position information of each image (frame) is output, and is supplied as a part of the video data to the decoding side (the video decoding device 20B).

FIG. 14 is a block diagram which shows an internal configuration of the video decoding device 20B according to the third embodiment.

The video decoding device 20B is different to that of the second embodiment in that the Wyner-Ziv decoding section 210A is replaced with a Wyner-Ziv decoding section 210B. Further, the Wyner-Ziv decoding section 210B is different to that of the second embodiment in that the SI selection section 219 is replaced with an SI selection section 219B.

The SI selection section 219B is different to that of the second embodiment in that the SI selection signals are generated by using the updated pixel position information supplied from the video encoding device 10B.

(C-2) Operations of the Third Embodiment

Next, the operations of the video distribution system 1B of the third embodiment, which has a configuration such as that described above, will be described.

First, the operations of the encoding process of the video encoding device 10 will be described by using the flow chart of FIG. 15.

Figure 15:
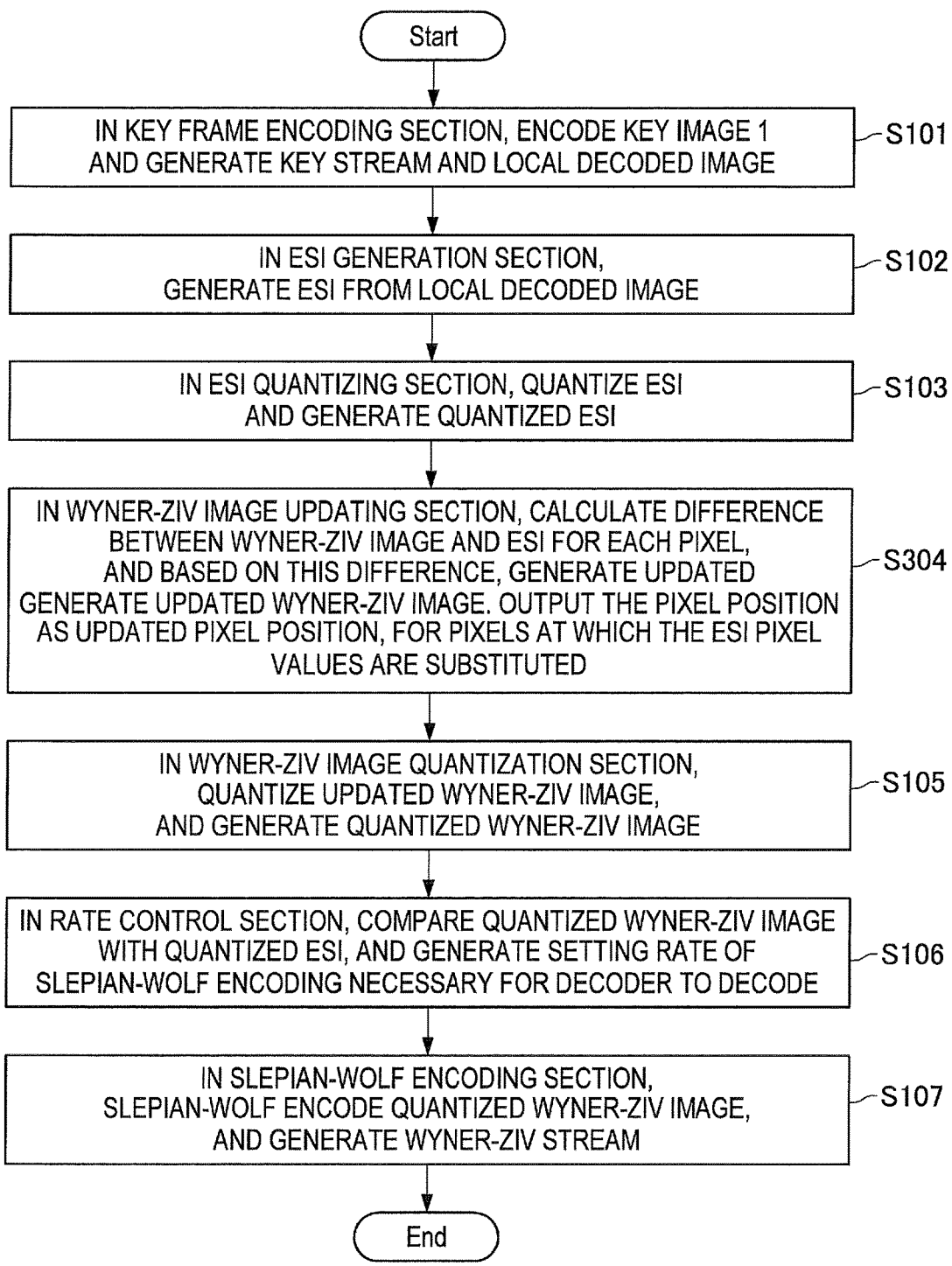
FIG. 15 is a flow chart which shows operations of the video encoding device according to the third embodiment of the present invention.

Since the flow chart shown in FIG. 15 is similar to the flow chart of FIG. 4 of the first embodiment described above, with the exception of step S104 being replaced with step S304, only the differences between step S104 and step S304 will be described here.

In step S304, in the Wyner-Ziv image updating section 111B, a process is performed which generates and outputs updated pixel position information showing the position of pixels at which the quantized values of the ESI side are adopted, when generating an updated Wyner-Ziv image. Since the other operations in the video encoding device 10B are similar to those of the description of FIG. 4 described above, the description of them will be omitted.

Next, the operations of the decoding process of the video decoding device 20A will be described by using the flow chart of FIG. 16.

Figure 16:
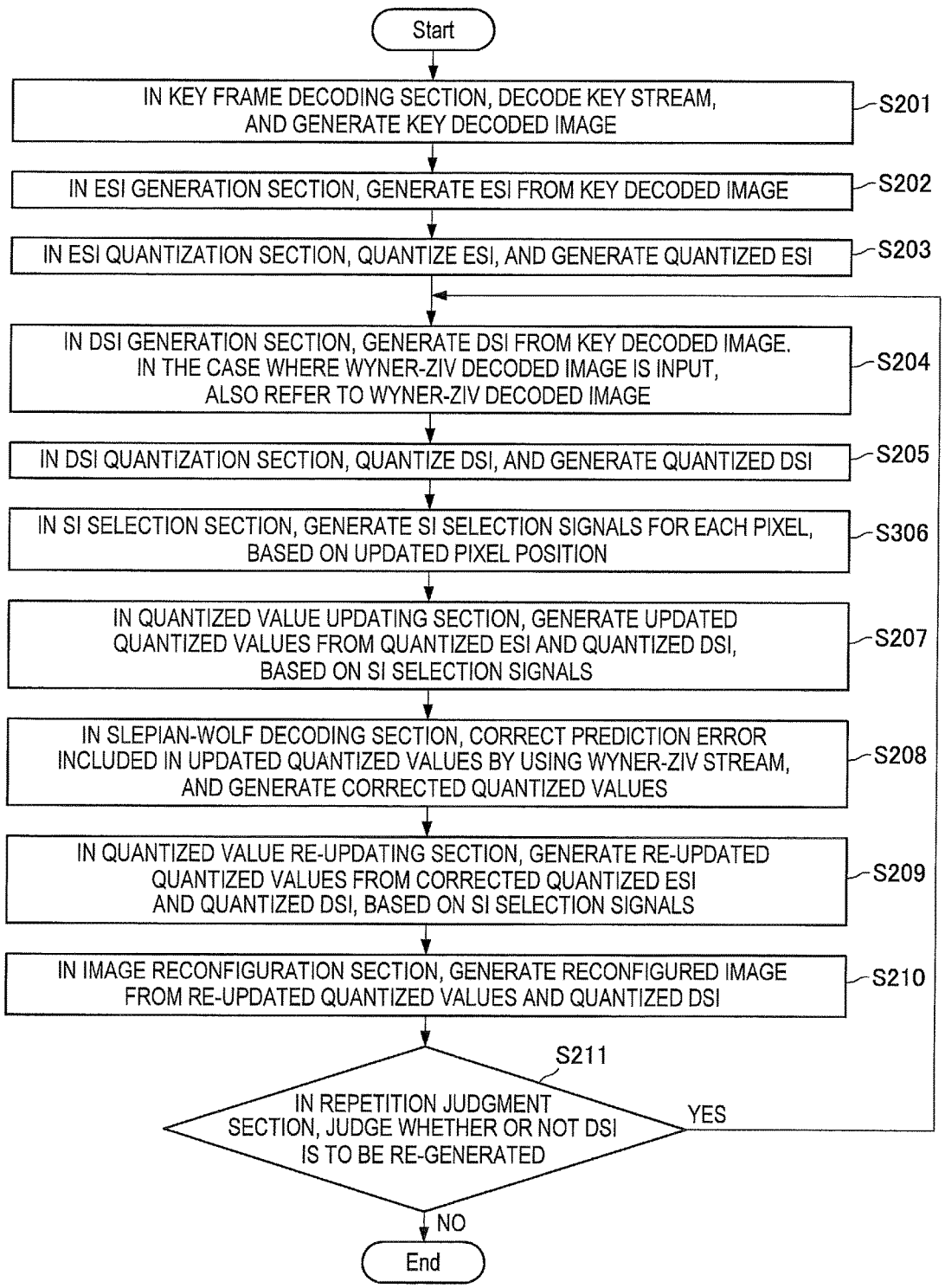
FIG. 16 is a flow chart which shows operations of the video decoding device according to the third embodiment of the present invention.

Since the flow chart shown in FIG. 16 is similar to the flow chart of FIG. 11 of the second embodiment described above, with the exception of step S206 being replaced with step S306, only the differences between step S206 and step S306 will be described here.

In step S306, in the SI selection section 219B, SI selection signals are generated for each pixel, by using the updated pixel position information supplied from the video encoding device 10B. The SI selection section 219B generates control signals, which designate the quantized values of the ESI side as the SI selection signals, for pixels which have been specified by the updated pixel position information, and generates control signals, which designate the quantized values of the DSI side as the SI selection signals, for other pixels. Since the other operations in the video decoding device 20B are similar to those of the description of FIG. 11 described above, the description of them will be omitted.

(C-3) Effect of the Third Embodiment

According to the third embodiment, in addition to the effect of the second embodiment, the following effect can be accomplished.

In the video encoding device 10B, the SI selection section 219B can generate SI selection signals, without generating estimation errors (the above described side effects in the second embodiment), by generating updated pixel position information and transmitting this updated pixel position information to the video decoding device 20B.

Further, it is not necessary to repeatedly generate DSI, since it is not necessary to use corrected quantized values to generate SI selection signals in the third embodiment.

(D) Other Embodiments

The present invention is not limited to the above described embodiments, and can be accomplished by modified embodiments such as those shown in the following examples.

(D-1) In order to aid understanding, the above described embodiments will be described as processing as it is of a parameter form (pixel domain form) represented by pixel values or quantized values of each pixel, without performing a conversion process by DCT conversion or the like, such as in Non-Patent Literature 1, for each image (input Wyner-Ziv, ESI, DSI) used for encoding and decoding. However, the parameter form for expressing each image is not limited to the pixel domain form in the present invention, and may be a parameter form represented by quantized values of each conversion coefficient area by DCI conversion or the like (transform domain form). In the case of a transform domain form, the pixel values (quantized values) of pixels in the above described embodiments are replaced with quantized values of each conversion coefficient area. In the above described embodiments, in the case where each image used in encoding and decoding (input Wyner-Ziv, ESI and DSI) is processed by a transform domain form, a conversion processing section, which converts a parameter sequence of the transform domain form, may be added prior to the stage of the quantization process.

In the above described embodiments, the pixel values of each pixel can be viewed as a parameter sequence arranged as parameters. Then, the meaning of the number of parameter sequences and each parameter, which are to be encoded and decoded, is not limited to an encoding process and decoding process of a DVC method based on Slepian-Wolf theory and Wyner-Ziv theory. Therefore, an effect similar to that of the above described embodiments can be accomplished, even if the form (such as the number of parameters) of a parameter sequence for expressing each image is changed.

(D-2) In the above described embodiments, while ESI and DSI are generated from the key image in the video decoding device, they may be generated from a Wyner-Ziv decoded image in another time. Further, in the case where there is a scalable structure, such as that of Non-Patent Literature 3, in the video decoding device, DSI may be generated by using the information of the base layer.

(D-3) In each of the above embodiments, while re-generation of DSI is performed in the video decoding device, since the regeneration process of DSI may not be necessary in the first and third embodiments, they may be omitted.

(D-4) In the video encoding devices of the above described embodiments, while they are configurations which determine the setting rate by an estimation result from the rate control section, they may be configurations which rate-control by a feedback approach from a video decoding device, such as that of Non-Patent Literature 1. In the case of rate-control by a feedback approach, the ESI quantization section may be omitted.

(D-5) In the above described embodiments, in the case where there is an environment in which the above described effect of the present invention is not able to be produced, they may be used for suppressing an increase of the computation amount, by a configuration which is able to turn off the functions of part of the structural elements.

For example, in the video encoding device of the first to third embodiments, in the case of an environment in which the effect of the present invention is not able to be produced, it may be possible to turn off the functions of the Wyner-Ziv image updating section. In this case, in the video encoding section, the input Wyner-Ziv image may be supplied to the Wyner-Ziv image quantization section as it is.

Further, for example, in the video image decoding device of the second and third embodiments, in the case of an environment in which the effect of the present invention is not able to be produced, it may be possible to turn off the functions of the ESI generation section, the ESI quantization section, the quantized value updating section, the SI selection section, and the quantized value re-updating section. In this case, the corrected quantized values are supplied to the image reconfiguration section as they are. Further in this case, the quantized DSI is supplied to the Slepian-Wolf decoding section as it is.

For example, a case where the quantization of ESI and DSI is performed by the video encoding device and/or the video decoding device can be included as an environment in which the above effect of the present invention is not able to be produced.

For example, in the second and third embodiments, a case where a generation algorithm of ESI is different at the video encoding device side and the video decoding device side can be included as an environment in which the above effect of the present invention is also not able to be produced. While a method, which confirms whether or not generation algorithms of ESI are mutually the same between the video encoding device and the video decoding device, is not limited, it may be a configuration, for example, which exchanges and confirms form information of the generation algorithms of ESI (for example, an ID given to each algorithm), which is able to correspond between both devices. Note that in the case where a plurality of ESI generation algorithms correspond to the video encoding device and the video decoding device, form information of corresponding generation algorithms of ESI between each device may be exchanged, and a process of a negotiation, which is used to determine a common corresponding generation algorithm, may be performed.

(D-6) In each of the above embodiments, while the video encoding device and the video decoding device are described as being connected by a communication route such as a network, the video encoding device and the video decoding device may not have a configuration in which direct communication is possible. For example, video data, which the video encoding device has generated (data of a Wyner-Ziv stream and a key stream), may be recorded to a medium such as a DVD or a hard disk, and may be supplied to the video decoding device offline.

What is claimed is:

1. A video encoding device which encodes a video signal having a frame sequence, comprising:
    a predicted image generator which generates a predicted image of a non-key frame, by using a key frame in the frame sequence;
    an updated original image generator which
        receives an original image of the non-key frame and the predicted image of the non-key frame, and
        generates an updated original image by, for each pixel position in the updated original image,
            obtaining a difference between a parameter value of the pixel at the pixel position in the original image and a parameter value of the pixel at the pixel position in the predicted image,
            comparing the obtained difference with a predetermined quantization error, and
            selecting
                the parameter value of the pixel at the pixel position in the predicted image if the obtained difference is no larger than the predetermined quantization error, and
                the parameter value of the pixel at the pixel position in the original image if the obtained difference is larger than the predetermined quantization error,
            to be a parameter value of the pixel at the pixel position in the updated original image
    a first quantizer which quantizes the updated original image outputted by the updated original image generator;
    a second quantizer which quantizes the predicted image outputted by the predicted image generator;
    a rate control section which compares the quantized updated original image and the predicted image to determine an amount of codes per image; and
    an error correction code generator which generates an error correction code, for correcting an error of the updated original image with respect to the non-key frame, using the quantized updated original image based on the determined amount of codes per image, wherein
    the parameter value of each pixel is a pixel value of said each pixel in the original or predicated image,
    each of the predicted image and the updated original image is of same dimensions as those of the original image, and
    the updated original image outputted by the updated original image generator differs from the original image only in that, for each pixel position where a difference between the original image and the predicted image is no larger than the predetermined quantization error, the updated original image has such a parameter value that a difference between the updated original image and the predicted image at said each pixel position is zero, to thereby cause a setting rate of the error correction code generated by the error correction code generator to be reduced.

2. The video encoding device according to claim 1, wherein the error correction code generator generates the error correction code by using the quantized updated original image and the predicted image.

3. The video encoding device according to claim 1, wherein the updated original image generator uses a value corresponding to half of a quantization step width used by a quantization process of the first quantizer as the quantization error.

4. The video encoding device according to claim 1, wherein the updated original image generator uses a value corresponding to a quantization step width used by a quantization process of the first quantizer as the quantization error.

5. The video encoding device according to claim 4, further comprising:
   a parameter identification information generator which outputs parameter identification information showing pixel positions, obtained by selecting the parameter values of the predicted image for the updated original image which the updated original image generator has generated; and
   an outputer which outputs data including the error correction code which the error correction code generator has generated, and the parameter identification information which the parameter position information generator has generated, as data related to the non-key frame.

6. A video decoding device which decodes video data obtained by encoding a video signal having a frame sequence, comprising:
   a key frame decoder which obtains a key frame by decoding encoded data of a key frame included in the video data;
   a first predicted image generator which generates a first predicted image of a non-key frame in the frame sequence, by using the decoded key frame;
   a first quantizer which quantizes the first predicted image outputted by the first predicted image generator;
   a second predicted image generator which generates a second predicted image of the non-key frame in the frame sequence using the decoded key frame outputted by the key frame decoder, the second predicted image being the same as another predicted image of the non-key frame used when generating encoded data of the non-key frame, the encoded data being an error correction code that corrects an error of the another predicted image with respect to an original image of the non-key frame;
   a second quantizer which quantizes the second predicted image outputted by the second predicted image generator;
   an updated predicted image generator which generates an updated predicted image by, for each pixel position in the updated predicted image,
     obtaining a quality value for a first parameter value, which is a parameter value of the pixel at the pixel position in the quantized first predicted image outputted by the first quantizer,
     comparing the quality value with a predetermined threshold, and
     selecting
       the first parameter value if the quality value is higher that the predetermined threshold, and
       a second parameter value, which is a parameter value of the pixel at the pixel position in the quantized second predicted image outputted by the second quantizer, if the quality value is lower that the predetermined threshold,
   to be a parameter value of the pixel at the pixel position in the updated predicted image; and
   an error corrector which generates a corrected image which is corrected by using the error correction code for the updated predicted image of the non-key frame, wherein
   the parameter value of each pixel is a pixel value of said each pixel in the quantized first or second predicted image,
   each of the quantized first predicted image, the quantized second predicted image and the updated predicted image is of same dimensions as those of the non-key frame, and
   the updated predicted image outputted by the updated predicted image generator differs from the quantized first predicted image only in that, for each pixel position where the quality value for the first parameter value is lower than the predetermined threshold, the updated predicted image has such a parameter value that a difference between the updated predicted image and the second parameter value is zero, so as to be correctable by the error correction code.

7. The video decoding device according to claim 6, further comprising:
   a re-updated image generator which generates a re-updated image, in which the parameter values of pixel positions, obtained by applying the parameter values of the quantized second predicted image by the updated prediction image generator, are replaced with parameter values of the quantized first predicted image for corrected images of the non-key frame generated by the error corrector.

8. The video decoding device according to claim 7, wherein the first predicted image generator is configured to re-generate a first predicted image of an identical key frame, by using the generated corrected image of the error corrector;
   wherein the first quantizer quantizes the re-generated first predicted image; and
   wherein upon detecting that the first predicted image is re-generated by the first predicted image generator, the updated predicted image generator compares parameter values of the quantized re-generated first predicted image, the quantized second predicted image, and the corrected image generated at a previous time by the error corrector, for each pixel position of the non-key frame, and based on a result of the comparison, re-generates an updated predicted image by selecting parameter values of either the quantized re-generated first predicted image or the quantized second original image for said each pixel position.

9. The video decoding device according to claim 8, wherein upon detecting that the first predicted image is re-generated by the first predicted image generator, the updated predicted image generator generates the updated predicted image.

10. The video decoding device according to claim 8, wherein upon detecting that parameter identification information for identifying one or a plurality of pixel positions is included as encoding data of the non-key frame in the video data, the updated predicted image generator selects the parameter values of the quantized second predicted image for pixel positions shown in the parameter identification information, and selects the parameter values of the quantized re-generated first predicted image for pixel positions not shown in the parameter identification information.

11. A non-transitory computer-readable medium having video encoding program instructions stored thereon, execution of which by a computer, mounted on a video encoding device which encodes a video signal having a frame sequence, causes the computer to provide functions of:
  a predicted image generator which generates a predicted image of a non-key frame by using a key frame in the frame sequence;
  an updated original image generator which
    receives an original image of the non-key frame and the predicted image of the non-key frame, and
    generates an updated original image by, for each pixel position in the updated original image,
      obtaining a difference between a parameter value of the pixel at the pixel position in the original image and a parameter value of the pixel at the pixel position in the predicted image,
      comparing the obtained difference with a predetermined quantization error, and
      selecting
        the parameter value of the pixel at the pixel position in the predicted image if the obtained difference is no larger than the predetermined quantization error, and
        the parameter value of the pixel at the pixel position in the original image if the obtained difference is larger than the predetermined quantization error,
      to be a parameter value of the pixel at the pixel position in the updated original image;
  a first quantizer which quantizes the updated original image outputted by the updated original image generator;
  a second quantizer which quantizes the predicted image outputted by the predicted image generator;
  a rate control section which compares the quantized updated original image and the predicted image to determine an amount of codes per image; and
  an error correction code generator which generates an error correction code, for correcting an error of the updated original image with respect to the non-key frame, using the quantized updated original image based on the determined amount of codes per image, wherein
  the parameter value of each pixel is a pixel value of said each pixel in the original or predicated image,
  each of the predicted image and the updated original image is of same dimensions as those of the original image, and
  the updated original image outputted by the updated original image generator differs from the original image only in that, for each pixel position where a difference between the original image and the predicted image is no larger than the predetermined quantization error, the updated original image has such a parameter value that a difference between the updated original image and the predicted image at said each pixel position is zero, to thereby cause a setting rate of the error correction code generated by the error correction code generator to be reduced.

12. A non-transitory computer-readable medium having video decoding program instructions stored thereon, execution of which by a computer, mounted on a video decoding device which decodes video data obtained by encoding a video signal having a frame sequence, causes the computer to provide functions of:
  a key frame decoder which obtains a key frame by decoding encoded data of a key frame included in the video data;
  a first predicted image generator which generates a first predicted image of a non-key frame in the frame sequence, by using the decoded key frame;
  a first quantizer which quantizes the first predicted image outputted by the first predicted image generator;
  a second predicted image generator which generates a second predicted image of the non-key frame in the frame sequence using the decoded key frame outputted by the key frame decoder, the second predicted image being the same as another predicted image of the non-key frame used when generating encoded data of the non-key frame, the encoded data being an error correction code that corrects an error of the another predicted image with respect to an original image of the non-key frame;
  a second quantizer which quantizes the second predicted image outputted by the second predicted image generator;
  an updated predicted image generator which generates an updated predicted image by, for each pixel position in the updated predicted image,
    obtaining a quality value for a first parameter value, which is a parameter value of the pixel at the pixel position in the quantized first predicted image outputted by the first quantizer,
    comparing the quality value with a predetermined threshold, and
    selecting
      the first parameter value if the quality value is higher that the predetermined threshold, and
      a second parameter value, which is a parameter value of the pixel at the pixel position in the quantized second predicted image outputted by the second quantizer, if the quality value is lower that the predetermined threshold,
    to be a parameter value of the pixel at the pixel position in the updated predicted image; and
  an error corrector which generates a corrected image which is corrected by using the error correction code for the updated predicted image of the non-key frame, wherein
  the parameter value of each pixel is a pixel value of said each pixel in the quantized first or second predicted image,
  each of the quantized first predicted image, the quantized second predicted image and the updated predicted image is of same dimensions as those of the non-key frame, and
  the updated predicted image outputted by the updated predicted image generator differs from the quantized first predicted image only in that, for each pixel position where the quality value for the first parameter value is lower than the predetermined threshold, the updated predicted image has such a parameter value that a difference between the updated predicted image and the second parameter value is zero, so as to be correctable by the error correction code.

13. A video distribution system comprising
  the video encoding device of claim 1, said video encoding device generating video data by encoding a video signal having a frame sequence, and a video decoding device which decodes the video data supplied from the video encoding device.

14. The video distribution system according to claim 13, wherein the video decoding device comprises:
a key frame decoder which obtains a key frame by decoding encoded data of a key frame included in the video data;
a first predicted image generator which generates a first predicted image of a non-key frame in the frame sequence, by using the decoded key frame;
a first quantizer which quantizes the first predicted image;
a second predicted image generator which generates a second predicted image of the non-key frame in the frame sequence using the decoded key frame, the second predicted image being the same as another predicted image of the non-key frame used when generating encoded data of the non-key frame, the encoded data being an error correction code that corrects an error of the another predicted image with respect to an original image of the non-key frame;
a second quantizer which quantizes the second predicted image;
an updated predicted image generator which generates an updated predicted image by, for each pixel position in the updated predicted image, selecting the parameter value of the pixel at the pixel position in either the quantized first predicted image or the quantized second predicted image as being a parameter value of the pixel at the pixel position in the updated predicted image; and
an error corrector which generates a corrected image which is corrected by using the error correction code for the updated predicted image of the non-key frame.

15. The video encoding device according to claim 3, further comprising:
a parameter identification information generator which outputs parameter identification information showing pixel positions, obtained by selecting the parameter values of the predicted image for the updated original image which the updated original image generator has generated; and
an outputer which outputs data including the error correction code which the error correction code generator has generated, and the parameter identification information which the parameter position information generator has generated, as data related to the non-key frame.

16. The video encoding device according to claim 2, further comprising:
a parameter identification information generator which outputs parameter identification information showing pixel positions, obtained by selecting the parameter values of the predicted image for the updated original image which the updated original image generator has generated; and
an outputer which outputs data including the error correction code which the error correction code generator has generated, and the parameter identification information which the parameter position information generator has generated, as data related to the non-key frame.

17. The video encoding device according to claim 1, further comprising:
a parameter identification information generator which outputs parameter identification information showing pixel positions, obtained by selecting the parameter values of the predicted image for the updated original image which the updated original image generator has generated; and
an outputer which outputs data including the error correction code which the error correction code generator has generated, and the parameter identification information which the parameter position information generator has generated, as data related to the non-key frame.

18. The video decoding device according to claim 6, wherein the first predicted image generator is configured to re-generate a first predicted image of an identical key frame, by using the generated corrected image of the error corrector;
wherein the first quantizer quantizes the re-generated first predicted image; and
wherein upon detecting that the first predicted image is re-generated by the first predicted image generator, the updated predicted image generator compares parameter values of the quantized re-generated first predicted image, the quantized second predicted image, and the corrected image generated at a previous time by the error corrector, for each pixel position of the non-key frame, and based on a result of the comparison, re-generates an updated predicted image by selecting a parameter value of either the quantized re-generated first predicted image or the quantized second original image for each parameter.

19. The video decoding device according to claim 18, wherein upon detecting that parameter identification information for identifying one or a plurality of pixel positions is included as encoding data of the non-key frame in the video data, the updated predicted image generator selects the parameter values of the quantized second predicted image for pixel positions shown in the parameter identification information, and selects the parameter values of the quantized re-generated first predicted image for pixel positions not shown in the parameter identification information.

* * * * *